United States Patent [19]
Martin et al.

[11] Patent Number: 6,003,305
[45] Date of Patent: Dec. 21, 1999

[54] METHOD OF REDUCING INTERNAL COMBUSTION ENGINE EMISSIONS, AND SYSTEM FOR SAME

[75] Inventors: Richard J. Martin; John D. Stilger, both of San Jose; Mark R. Holst, Concord, all of Calif.; John D. Young, Falkirk, United Kingdom; Michael P. Barkdoll, Knoxville, Tenn.; Bradley L. Edgar, Berkeley, Calif.

[73] Assignee: Thermatrix, Inc., San Jose, Calif.

[21] Appl. No.: 08/922,176

[22] Filed: Sep. 2, 1997

[51] Int. Cl.$^6$ .......................................................... F01N 3/00
[52] U.S. Cl. .................................. 60/274; 60/276; 60/297; 60/300; 60/303; 422/182
[58] Field of Search .............................. 60/274, 275, 276, 60/281, 288, 294, 297, 300, 303, 304; 55/DIG. 30, 196; 204/164; 422/171, 182, 175; 423/215.5, 213.2, 213.5, 213.7

[56] References Cited

U.S. PATENT DOCUMENTS

| | | |
|---|---|---|
| 1,812,341 | 6/1931 | Jaeger . |
| 2,795,054 | 6/1957 | Bowen, III . |
| 2,976,853 | 3/1961 | Hunter et al. . |
| 3,661,497 | 5/1972 | Castelluci et al. . |
| 3,769,922 | 11/1973 | Furlong et al. . |
| 3,807,090 | 4/1974 | Moss . |
| 3,810,732 | 5/1974 | Koch . |
| 3,888,193 | 6/1975 | Kishigami et al. . |
| 3,900,554 | 8/1975 | Lyon . |
| 3,942,264 | 3/1976 | Zenkner . |

(List continued on next page.)

OTHER PUBLICATIONS

Burke, S.P. et al., "Diffusion Flames", *First Symposium (International) on Combustion,* 1954, 2–11.

"California could end heavy diesel vehicle sales", *Oil and Gas J.*, 1994, 42 and 44.

Control of Air Pollution from New Motor Vehicles and New Motor Engines, *Federal Register*, 1993, 58(55), 15781–15802.

(List continued on next page.)

*Primary Examiner*—Edward K. Look
*Assistant Examiner*—Binh Tran
*Attorney, Agent, or Firm*—Woodcock Washburn Kurtz Mackiewicz & Norris LLP

[57] ABSTRACT

A process is provided for preparing oxymorphone from morphine by:

(1) reacting morphine with (1a) an acyl halide or anhydride to form 3-acylmorphine, or (1b) reacting morphine with benzyl-halide to form 3-benzylmorphine;

(2) Oxidizing the 6-hydroxy group of the 3-acyl or 3-benzylmorphine so as to form the corresponding 3-acyl or 3-benzylmorphinone; and thereafter either by (3a) or (3b):

(3a) introducing a β-oriented hydroxy group at the 14-position of the 3-acyl- or 3-benzyl-morphinone with aqueous hydrogen peroxide and an acid at a temperature of about 15° to about 70° C. to form the 3-acyl or 3-benzyl-14-hydroxymorphinone;

(3b) acylating the 3-acyl or 3-benzyl-morphinone with an acylating agent so as to form the dienol acylate followed by oxidizing the dienol acetate to the corresponding 3-acyl or 3-benzyl-14-hydroxymorphinone;

(4) hydrogenating the 3-acyl-14-hydroxymorphinone with a catalyst so as to form the 3-acyloxymorphone;

(5) hydrolyzing the 3-acyl-oxymorphone with aqueous acidic or basic solution to form oxymorphone;

(6) hydrogenating the 3-benzyl-14-hydroxymorphinone with a catalyst so as to form oxymorphone.

59 Claims, 12 Drawing Sheets

U.S. PATENT DOCUMENTS

| | | |
|---|---|---|
| 4,047,876 | 9/1977 | Rice . |
| 4,252,070 | 2/1981 | Benedick . |
| 4,259,088 | 3/1981 | Moss . |
| 4,284,401 | 8/1981 | Tatebayashi et al. . |
| 4,355,504 | 10/1982 | Liu et al. . |
| 4,380,149 | 4/1983 | Ludecke . |
| 4,400,356 | 8/1983 | McVay et al. . |
| 4,441,971 | 4/1984 | Ishiguro et al. .......................... 204/164 |
| 4,475,884 | 10/1984 | Shang et al. . |
| 4,481,767 | 11/1984 | Stark . |
| 4,520,624 | 6/1985 | Kiyota et al. .............................. 60/286 |
| 4,529,374 | 7/1985 | Malik et al. . |
| 4,535,588 | 8/1985 | Sato et al. ................................. 60/286 |
| 4,627,812 | 12/1986 | Kelly et al. . |
| 4,643,667 | 2/1987 | Fleming . |
| 4,646,660 | 3/1987 | Björkman et al. . |
| 4,649,703 | 3/1987 | Dettling et al. ............................ 60/275 |
| 4,688,495 | 8/1987 | Galloway . |
| 4,702,075 | 10/1987 | Jenny . |
| 4,716,844 | 1/1988 | Koch . |
| 4,741,690 | 5/1988 | Heed . |
| 4,785,768 | 11/1988 | Brown et al. . |
| 4,807,695 | 2/1989 | Ward . |
| 4,823,711 | 4/1989 | Kroneberger et al. . |
| 4,828,481 | 5/1989 | Weil et al. . |
| 4,838,782 | 6/1989 | Wills . |
| 4,941,415 | 7/1990 | Pope et al. . |
| 4,953,512 | 9/1990 | Italiano . |
| 4,969,328 | 11/1990 | Kammel .................................... 60/275 |
| 4,974,530 | 12/1990 | Lyon . |
| 4,987,738 | 1/1991 | Lopez-Crevillen et al. .............. 60/286 |
| 4,989,408 | 2/1991 | Leonhard et al. . |
| 5,028,405 | 7/1991 | Erdmannsdoerfer et al. . |
| 5,097,665 | 3/1992 | Kammel .................................... 60/275 |
| 5,141,714 | 8/1992 | Obuchi et al. .......................... 422/174 |
| 5,165,884 | 11/1992 | Martin et al. . |
| 5,279,630 | 1/1994 | Brinkmann ....................... 55/DIG. 30 |
| 5,320,518 | 6/1994 | Stilger et al. . |
| 5,394,692 | 3/1995 | Teuber-Ernst ............................. 60/303 |
| 5,410,875 | 5/1995 | Tanaka et al. . |
| 5,426,936 | 6/1995 | Levendis et al. . |
| 5,457,945 | 10/1995 | Adiletta .................................... 60/311 |
| 5,533,890 | 7/1996 | Holst et al. . |
| 5,547,650 | 8/1996 | Edgar et al. . |
| 5,601,790 | 2/1997 | Stilger et al. . |
| 5,628,186 | 5/1997 | Schmelz ................................... 60/274 |
| 5,635,139 | 6/1997 | Holst et al. . |
| 5,637,283 | 6/1997 | Stilger et al. . |
| 5,650,128 | 7/1997 | Holst et al. . |
| 5,800,790 | 9/1998 | Imamura et al. . |

OTHER PUBLICATIONS

"Focus on Industry Solutions for Exhaust Pollution Control", *Automotive Engineer*, 1994, pp. 18,20,22,24,26,27,28, 29.

Haynes, B.S. et al., "Soot Formation", *Progress in Energy and Combustion Science*, 1990, 7, 229–273.

Kahair, M.K. et al., "Design and Development of Catalytic Converters for Diesels", SAE paper 921677, 1992, 199–209.

Keeney, T.R.E., *Auto Emissions*, 1995, 5, 4 Sheets.

Wagner et al., "SCR succeeds at Logan Generating Plant", *Power Engin.*, 1997, 28–32.

U.S. application No. 08/921,815, Martin et al., filed Sep. 2, 1997.

U.S. application No. 08/922,189, McAdams et al., filed Sep. 2, 1997.

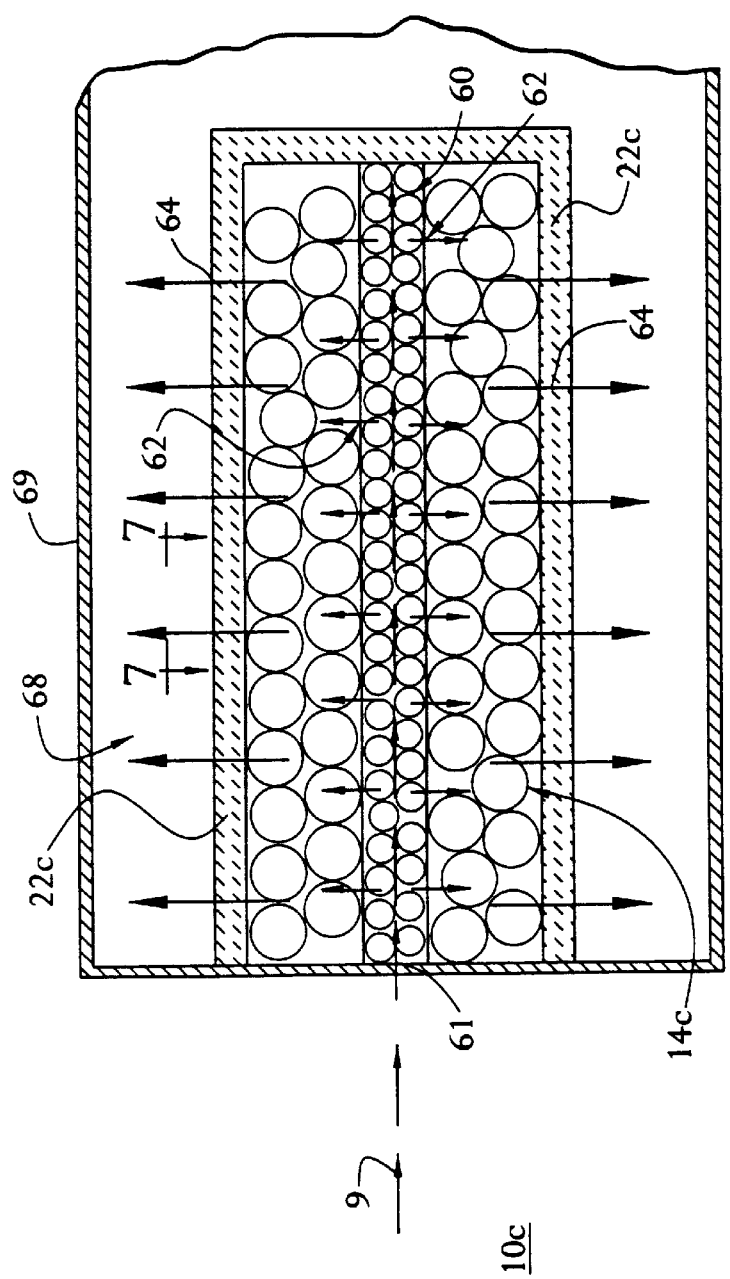
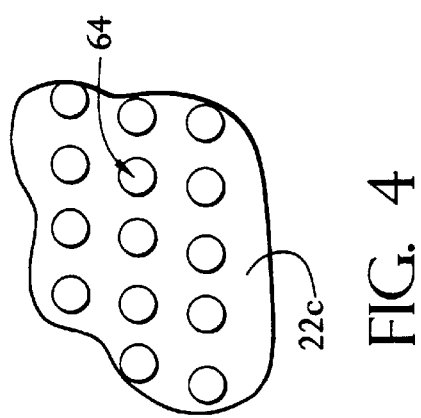
FIG. 3
FIG. 4

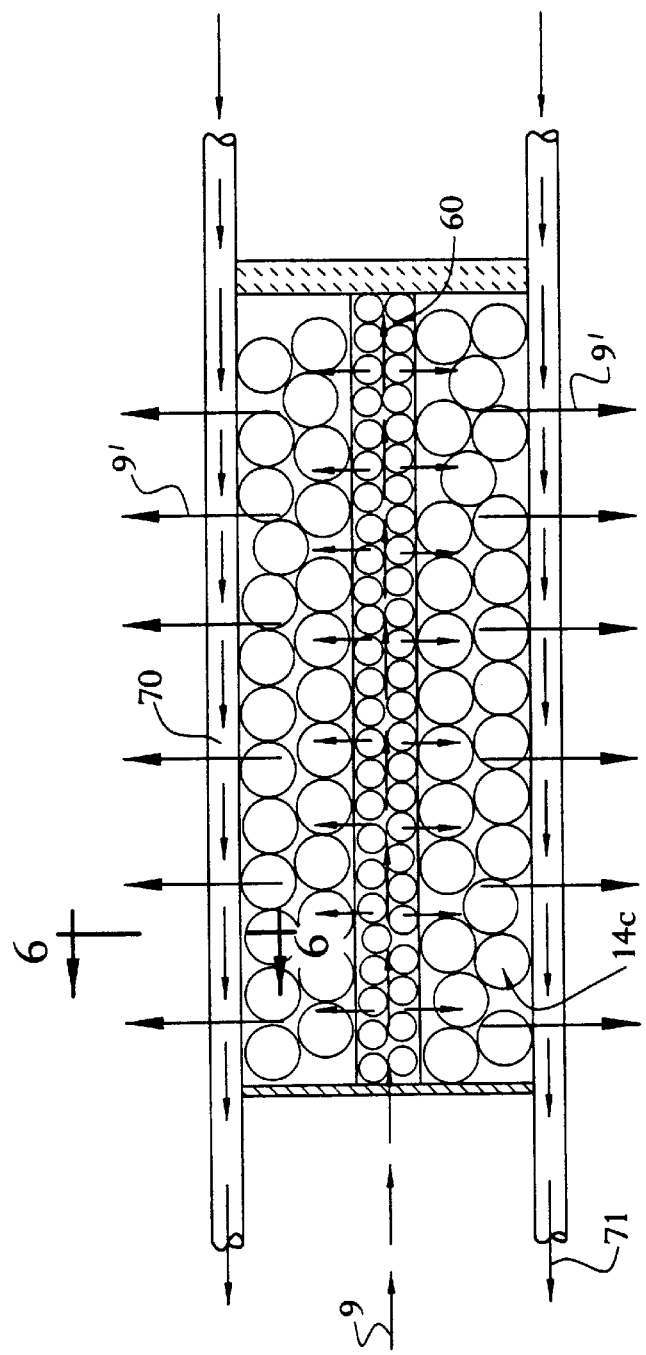
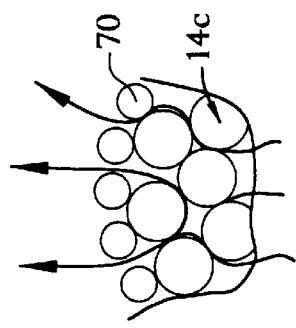
FIG. 5
FIG. 6

METHOD OF REDUCING INTERNAL COMBUSTION ENGINE EMISSIONS, AND SYSTEM FOR SAME

FIELD OF THE INVENTION

This invention relates to reducing pollutant concentration in a process gas stream. More particularly, this invention oxidizes soot and products of incomplete combustion in internal combustion engine exhaust emissions by use of a flameless thermal oxidizer.

BACKGROUND OF THE INVENTION

Internal combustion engines produce emissions containing water vapor, products of incomplete combustion such as, carbon monoxide and unburned hydrocarbons, carbon dioxide, oxides of nitrogen [NOx], carbonaceous soot and other combustible particulate matter, and other particulates and gaseous constituents. Oxides of nitrogen, products of incomplete combustion, and particulates are considered atmospheric pollutants. The particulate matter may also contain condensed hazardous compounds Such emissions produce well-known harmful effects to environmental quality and human health. For example, engine soot emissions contribute to reduced atmospheric visibility and particulate fall out, and have been found to contain carcinogenic polycyclic aromatic hydrocarbons, such as naphthalene, acenaphthylene, anthracene, and chrysene. B. S. Haynes and H. G. Wagner, *Soot Formation,* Progress in Energy and Combustion Science, Vol. 7, at p. 229 (1990).

Further, because of its particle size, the particulate matter from diesel exhaust represents a respiratory health hazard. The particle size distribution of particulate matter from diesel engine exhaust is typically 80% minus 10 microns, and 77% minus one micron, based on aerodynamic particle diameter.

In response to air quality regulations, vehicle manufacturers install pollution control devices in internal combustion engine exhaust systems. Traditional engine pollution control devices employ a ceramic honeycomb monolith or a packed bed of pellets having a coating of a noble metal catalyst. Such devices catalyze the reactions of carbon monoxide and unburned hydrocarbons with oxygen, typically at approximately 500° F. to 800° F. Other devices employ catalysts that also catalyze the reaction of oxides of nitrogen. Unfortunately, two factors render such catalytic devices unsuitable for soot-laden gases that are commonly produced by diesel engines. First, the catalytic devices are ineffective at destroying soot. Second, the soot and other particulates deposit on the monolith, thereby preventing gaseous constituents from reaching the catalytic material, or possibly deactivating or poisoning the catalyst. Further, spent catalyst also may be classified as a hazardous substance. Moreover, such devices induce a substantial back-pressure on the engine, which reduces engine efficiency. Further, sulfur that is found in diesel and gasoline fuels can poison or deactivate the catalyst.

A technically feasible method of reducing soot emissions is to pass engine exhaust gas through a ceramic filter that can periodically be replaced or regenerated. These filters, however, have only 85% removal efficiency, impose a significant back pressure on the engine, and are expensive. Filter manufacturers estimate that filter prices would drop no lower than U.S. $8,800 each, even with economies of scale because of increased production. *Control of Air Pollution From New Motor Vehicles and New Motor Engines,* Federal Register, Vol. 58, No. 55, Mar. 24, 1993, p. 15786 (1993). Furthermore, the engine back pressure caused by the ceramic filter adds U.S. $2,000 in annual fuel costs to a typical urban bus because of reduced engine efficiency. Id.

One type of filter trap design regenerates itself by burning some engine fuel periodically, thereby oxidizing the soot accumulated on the filter surface. Another trap design continuously regenerates with the use of a catalyst. The latter trap design has achieved reduction efficiency of between 80 and 92% for particulate matter. *Focus on Industry Solutions for Exhaust Pollution Control,* Automotive Engineer, October/November 1994, at p. 18. Unfortunately, regenerative trap features add even more to the filter cost.

Thus, no commercially viable method currently exists for removing soot and other particulates from engine exhaust gases. The lack of effective soot treatment methods is especially problematic for diesel engines that produce high soot emissions. Despite the difficulty in controlling such emissions, the U.S. Environmental Protection Agency ("EPA") has implemented regulations restricting particulate matter emissions from buses and other heavy duty engines. *Control of Air Pollution From New Motor Vehicles and New Motor Engines,* Federal Register, Vol. 58, No. 55, Mar. 24, 1993, p. 15781.

Although eliminating particulate matter from diesel engines has been an intractable problem, industrial gas cleaning techniques have been employed to collect particulate in other applications. One technique for collecting and removing particles from a gas stream is electrostatic precipitation, which uses electrostatically charged surfaces to collect charged particles. An electrostatic precipitator device ("ESP") imparts a charge on particles within a gas stream by exposing the particles to an electric field. Plates or cylinders, which have a charge opposite that of both the electric field and the particles, attract and collect the charged particles. Conventional ESPs intermittently clear collected particles from the collection surface. Conventional dry-process ESPs clear collected particles by mechanical methods, such as mechanical shock or rapping, and conventional wet-process ESPs flush the particles with a liquid. After the particles are cleared from the collection surface, the particles fall into a hopper for disposal. Conventional ESPs are limited by the temperature limits of the internal components, and flammable gas constituents entering a conventional ESP are controlled to avoid ignition by arcing within the ESP.

Another technique for collecting particles entrained within a gas stream is centrifugal separation using a cyclone. In a conventional cyclone, an inlet air stream is directed to form a vortex. Centrifugal forces push particles within the gas stream to the wall of the cyclone shell, where they lose momentum and fall out of entrainment. Because the collection efficiency of a certain particle size depends on the mass and aerodynamic diameter of the particle, cyclones have higher collection efficiency on larger, more massive particles. For example, cyclones are generally effective at removing particles of greater than about three to five microns. Neither a conventional cyclone nor a conventional electrostatic precipitator can effectively reduce the large component of the diesel exhaust particulate matter that has a diameter of less than one micron.

In addition to regulations governing particulate matter and hydrocarbon emissions, internal combustion engines are the subject of regulations limiting NOx emissions. *Oil and Gas Journal,* Jul. 25, 1994, p.42. The simultaneous emission limits for both particulate matter and NOx presents a unique problem because the two pollutants typically have an inverse relationship in engine exhaust. Internal combustion engines generally can be configured and tuned to produce emissions having low soot and high NOx concentrations or, alternatively, high soot and low NOx concentrations. Traditionally, engines that employ catalytic devices are adjusted to minimize soot formation because of the catalysts' inability to handle high temperatures inherent in combustion of soot. Tradeoffs also typically compromise engine efficiency. Such adjustments result in high levels of NOx emissions.

In efforts to comply with regulatory limits, diesel engines have been redesigned to reduce particulate emissions. Such redesigns include, for example, a dramatically different combustion chamber design, manufacturing the engine with tighter bore tolerances to reduce the introduction of oil into the combustion chamber, and increasing injection pressures. Magdi K. Kahair and Bruce B. Bykowski, *Design and Development of Catalytic Converters for Diesels,* SAE paper 921677, p. 199. Although helpful, such redesigns have been inadequate to meet present and contemplated future regulatory emission limits. Advanced common rail high pressure injection of fuel is the primary technology for reducing particulate mass.

Although not generally employed in reducing NOx emissions from internal combustion engines, various techniques exist for reducing NOx emissions from gas streams in other applications. One technique for reducing NOx emissions is selective catalytic reduction (SCR), which destroys NOx in the presence of ammonia ($NH_3$) over a catalyst. Although selective catalytic NOx reduction is capable of high levels of NOx removal, the temperature of the exhaust must be in the range of 550° F.–800° F., which is typically below internal combustion engine outlet temperatures. Furthermore, the catalyst has the limitations discussed hereinabove.

Another approach for removing NOx is selective non-catalytic reduction (SNCR), which employs a chemical that selectively reacts, in the gas phase, with NOx in the presence of oxygen at a temperature greater than 1150° F. Chemical NOx reduction agents used in such processes include ammonia ($NH_3$), urea ($NH_2CONH_2$), cyanuric acid $(HNCO)_3$, iso-cyanate, hydrazene, ammonium sulfate, atomic nitrogen, melamine, methyl amines, and bi-urates.

Additional recent regulations require automobile manufacturers to reduce emission of organic vapor from vehicle fuel tanks. Typically, fuel tank control devices have a layer of activated carbon that absorbs the vapors and prevents their escape to the atmosphere. Periodically, the control devices require regeneration or replacement with fresh adsorbent material. Unfortunately, these devices are complex and expensive. Id.

Another option for reducing fuel tank emissions is to process them through the existing catalytic device in the engine exhaust system. However, conventional catalytic devices are generally unsuitable for use with concentrated fuel tank vapor. Specifically, concentrated fuel vapor combustion may raise the monolith temperature above the catalyst's upper temperature limit, thereby thermally deactivating the catalyst.

Therefore, it is an object of the present invention to provide a system and method for reducing internal combustion engine pollutant emissions in response to regulatory emission limits. Specifically, an object of the present invention is to provide a system and method for reducing soot concentration in an engine exhaust stream that overcomes the limitations of the prior art.

It is another object of the invention to provide a system and method for reducing soot concentration, while simultaneously enabling the reduction of NOx concentration, in an engine exhaust steam.

It is yet another object of the invention to provide a system and method for reducing the fuel vapor emissions from an engine fuel storage tank.

SUMMARY OF THE INVENTION

In order to achieve the above and other objects of the invention, a system and method for establishing reaction of an internal combustion engine exhaust stream within a flameless thermal oxidizer are provided. Upon initiation of the reaction, pollutants contained within the exhaust stream, especially products of incomplete combustion and soot, react within a self-sustaining reaction wave. The flameless thermal oxidizer comprises a matrix of heat-resistant media in which the reaction wave forms. Additionally, an air stream and a supplemental fuel stream may be provided to supply reactants, and a hot gas stream may be provided to supply process heat. Fuel tank vapors are included in the supplemental fuel stream.

Oxidizing soot within inert media is effective for several reasons. Uniform flow promotes even particle burnout and efficient use of space. Also, soot particles having high momentum may be captured within the matrix by inertial impaction. Because the media is inert, capturing enhances burnout of the soot, as distinguished from catalytic devices in which capturing poisons or deactivates the catalyst. A flameless thermal oxidizer, therefore, is capable of removing and destroying a greater portion of soot in an internal combustion engine exhaust stream (compared with filter and catalytic systems). Destruction and removal efficiency ("DRE") for soot in a flameless thermal oxidizer according to the present invention is between 88% and 97% for vehicle engines and 99.99% for stationary engines, depending on the particular configuration and soot residence time. Further, the thermal oxidizer may include means to increase the residence time of particles. Even high soot DRE may be achieved by optimizing thethermal oxidizer size. Moreover, a flameless thermal oxidizer's inherent heat recuperation enhances thermal efficiency.

The system according to the present invention comprises an internal combustion engine for producing an exhaust stream and a flameless thermal oxidizer containing a matrix of heat-resistant media. The flameless thermal oxidizer includes an inlet plenum for premixing and distributing the flow, a shell for housing the matrix, a heater for preheating the matrix and/or initiating the reaction, and a control system. The control system controls and adjusts the reaction wave by modifying the flow rate of the engine exhaust stream, air stream, supplemental fuel stream, and/or hot gas stream, or by controlling the heater. The position of the reaction wave is ascertained by plural temperature sensors disposed within the matrix along the flow path of the process stream.

The thermal oxidizer described herein may be located downstream from an engine, and between an engine exhaust and a turbo-charger. The latter location diminishes turbo-charger wear due to particle erosion and promotes thermal efficiency in at least two ways. First, ambient heat loss from the engine exhaust stream is minimized by close spacing between the components. Second, the increased enthalpy of the exhaust stream may be recovered by expansion through the turbine of the turbo-charger, which would reduce the overall energy of the added fuel (if any).

The flameless thermal oxidizer according to the present invention comprises three main embodiments, in addition to the embodiments employing means to improve particle retention time. First, in its conceptually simplest form, the process stream flows into one end of a cylindrical matrix and exits the opposing end. Second, the flameless thermal oxidizer may also have plural feed tubes that extend longitudinally through a cylindrical matrix. The process stream flows through the feed tubes and then through the matrix counter-current from the flow within the feed tubes. Because the exothermic reactions occur within the matrix, the process stream within the matrix transfers heat to the incoming stream within the feed tubes. A plenum may be located at the distal end of the matrix for introducing an air stream, a supplemental fuel stream, and/or a hot process gas stream for preheating purposes. Third, the flameless thermal oxidizer may have a single center tube that extends to the end of the matrix. The process stream flows longitudinally through the center tube, and flows radially from the center tube through tube ports, the matrix, and through shell holes.

In addition to the substantively planar reaction waves (occurring in the first two embodiments) and substantively cylindrical reaction waves (occurring in the third embodiment), the method according to the present invention encompasses forming reaction waves in a Bunsen form, a Burke-Schumann form, and an inverted V shape. The thermal oxidizer may employ an engineered matrix to form a reaction zone of these or other shapes.

In addition to destroying soot and products of incomplete combustion from internal combustion engines, the present invention also encompasses a system and method for reducing emission of oxides of nitrogen. Because of the inverse relationship between the formation of soot and NOx in internal combustion engines, the engine may be adjusted to produce a minimum NOx concentration and a high concentration of soot. Upon reduction of the soot content of the engine exhaust stream by a flameless thermal oxidizer, the resulting exhaust stream is low in NOx concentration because of the engine adjustments and because the flameless thermal oxidizer produces a minimal amount of thermal NOx. Further, a catalytic device for removing NOx may now be effectively employed downstream of a flameless thermal oxidizer since the flameless thermal oxidizer will destroy soot that might otherwise poison or plug the catalyst.

In another aspect of the present invention, a system and method for the simultaneous destruction of soot and NOx employs a thermal oxidizer into which a reductant stream is injected. The reductant destroys NOx according to, preferably, the selective non-catalytic reduction technique, although the present invention encompasses other NOx reduction techniques, such as SCR.

Because oxidation of a combustible particle depends on both exposure to high temperature and the time period of such exposure, increasing the residence time of the particles within the thermal oxidizer improves destruction and removal efficiency ("DRE") for particles. Specifically, a particle of a certain large aerodynamic size and mass may theoretically pass through a conventional thermal oxidizer before complete oxidation of the particle, depending on process equipment parameters.

To increase destruction and removal efficiency of soot, the flameless thermal oxidizer may be sized to provide a sufficient residence time to destroy the largest statistically relevant particle size, but such large sizing increases costs and uses increased space. To increase the destruction and removal efficiency ("DRE") of particles for a given thermal oxidizer size, an aspect of the present invention employs techniques to increase selectively the residence time within the thermal oxidizer of particles. These techniques include equipment and methods for using electrostatic forces and centrifugal forces to attract and temporarily to collect or diminish the effective velocity of the particles.

The electrostatic technique comprises imparting a charge onto particles and attracting and collecting particles within the thermal oxidizer. The charge is imparted by passing the particles through an electric field created by the electrical corona of a discharge electrode. The process stream is directed through a collection tube that is electrostatically charged with a polarity, preferably positive, that is opposite that of the discharge electrode. Because the particles have a polarity opposite that of the collection tube, the particles flow across the gas streamlines to the collection tube, where the particles reside until oxidized.

The centrifugal force technique comprises imparting an angular velocity component or spin onto the process stream as it longitudinally flows through a center feed tube. Particles that reach the surface of the tube either adhere to the wall or lose velocity because of boundary layer effects. Particles that adhere to the wall oxidize, while those that lose velocity have increased residence time.

Other and further objects and advantages will appear hereinafter.

BRIEF DESCRIPTION OF THE DRAWINGS

FIG. 3 is yet another embodiment of the flameless thermal oxidizer;

FIG. 4 is a detail view of a portion of the matrix shell of the flameless thermal oxidizer shown in FIG. 3;

FIG. 5 is still another embodiment of the flameless thermal oxidizer;

FIG. 6 is detail view along sectional line 6—6 of a portion of the matrix shell of the flameless thermal oxidizer shown in FIG. 5;

DETAILED DESCRIPTION OF THE PREFERRED EMBODIMENTS

A system and method for establishing reaction of an internal combustion engine exhaust stream will be described in reference to the Figures. Each of the embodiments described herein include a flameless thermal oxidizer for oxidizing soot in an engine exhaust stream. The specific embodiments illustrate various arrangements of subcomponents and auxiliary subsystems; however, the present invention is not limited to the specific arrangements described herein. Rather, the present invention encompasses any arrangement of inlets, outlets, plenums, and shells, as well as any combination of any flow stream, heater, burner, and control system. For example, the matrix of each embodiment may be equipped with an inlet plenum, although the present invention encompasses combining flow streams within a supply tube or within the matrix itself. Furthermore, the present invention encompasses any combination of one or more matrices or substantially hollow chambers in which the reaction may occur. U.S. Pat. Nos. 4,688,495 (Galloway) and 4,823,711 (Kroneberger et al.), which disclose early matrix oxidation advances, and U.S. Pat. Nos. 5,165,884 (Martin et al.), 5,320,518 (Stilger et al.), and 5,533,890 (Holst et al.), each of which are assigned to the present assignee, disclose thermal oxidizer systems and methods. Each of these patents is incorporated herein in its entirety by reference.

As used herein and in the appended claims, the terms "upstream" and "downstream" refer to relative directions according to the flow of a process stream 9. Likewise, the terms "upstream end" and "downstream end" refer to ends of the thermal oxidizer corresponding to the relative, directional locations according to the flow of process stream 9, as well as the portion of the matrix proximate the end. In counter-flow embodiments, shown for example in FIGS. 2, 7, 8, and 9, the "upstream end" refers to the end having the inlet, and the "downstream end" refers to the "distal end" or end opposite the inlet and outlet.

Figure 1:
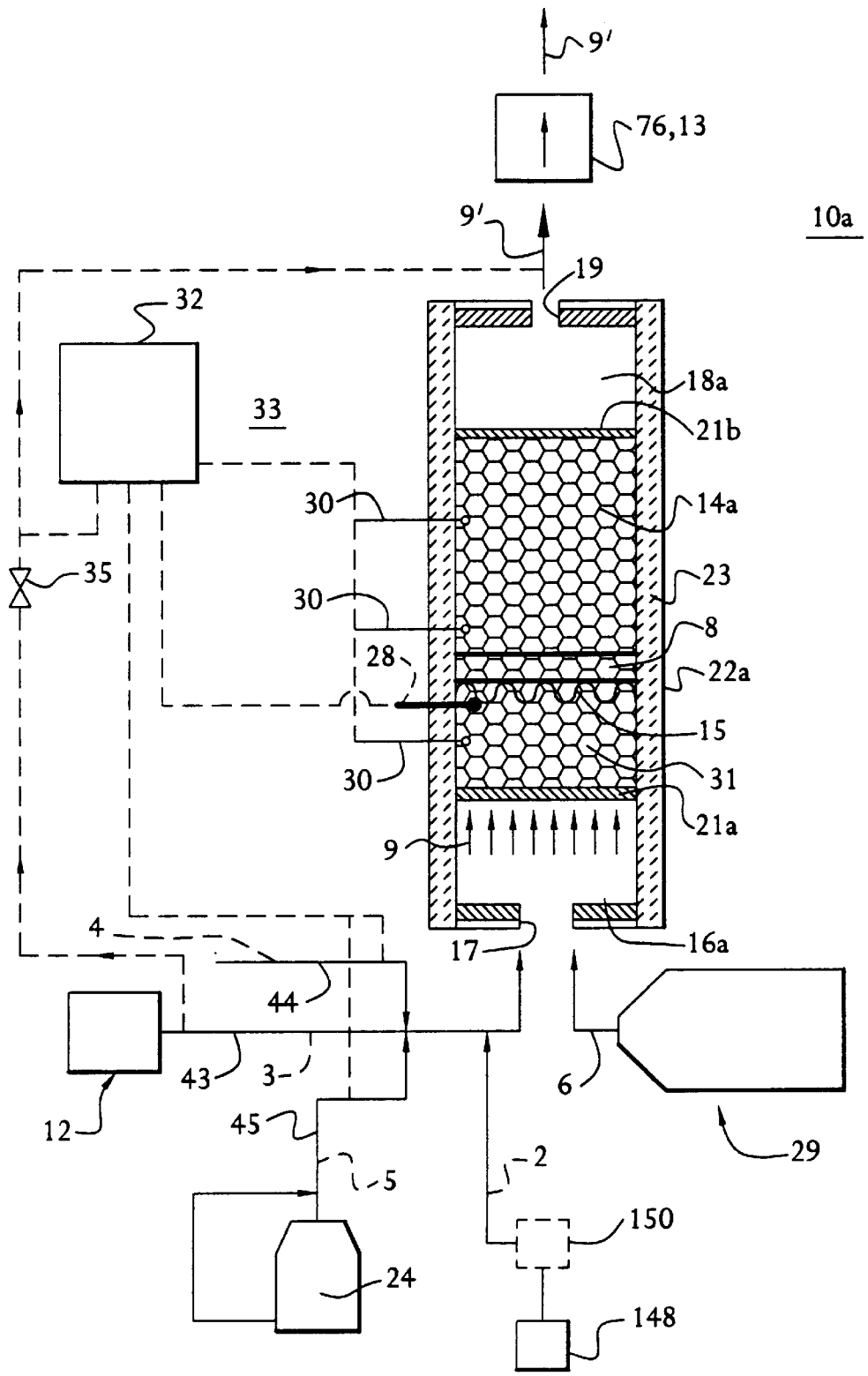
FIG. 1 is a view of an embodiment of the flameless thermal oxidizer for oxidizing soot according to the present invention.

Referring to FIG. 1 to illustrate the broad inventive concept that may be applied to other embodiments described herein, a first embodiment of the present invention includes a flameless thermal oxidizer 10a located downstream from an internal combustion engine 12. Flameless thermal oxidizer 10a includes: a matrix 14a, a matrix shell 22a, an inlet plenum 16a having an inlet 17, an outlet plenum 18a having an outlet 19, a heater 28, a burner 29, a control system 33, an engine exhaust supply tube 43, an air supply tube 44, and a supplemental fuel tube 45. Engine 12 encompasses heavy duty diesel and gasoline engines, for example diesel engines employed by trucks, buses, and heavy construction equipment; stationary diesel and gasoline engines, for example engines employed by emergency generators or auxiliary steam production equipment; diesel and gasoline engines in passenger automobiles and light trucks; and small gasoline engines, for example lawn mower and motorcycle engines. Preferably, engine 12 is a heavy duty diesel engine that exhibits an inverse soot-NOx relationship, as described above. For clarity, engine 12 is omitted from all figures except FIG. 1.

Internal combustion engine 12 produces an engine exhaust stream 3, which typically comprises combustion products, products of incomplete combustion, oxides of nitrogen, combustible and/or carbonaceous particulate matter (soot), and un-reacted oxygen and nitrogen. It is understood that the particulate matter may contain both combustible and non-combustible constituents. The term "stream," as used in this specification and appended claims, broadly refers to a any combination of flowing gas that may contain solid or liquid particulate matter. For convenience, unburned hydrocarbon fuel, if any, that may pass through engine 12 without reacting will be considered as part of the products of incomplete combustion.

An engine exhaust tube 43 for directing engine exhaust stream 3 is coupled to oxidizer inlet 17. Depending on the characteristics of engine exhaust stream 3, it may be advantageous to add an air stream 4 to supply additional reactant oxygen, as well as a supplemental fuel stream 5 to supply reactant fuel. In such circumstances, an air supply tube 44 and a supplemental fuel tube 45 may be coupled to inlet 17 or may be coupled to a port through matrix shell 22a so as to bypass a portion of matrix 14a. Air stream 4 may be pre-heated by incorporating a heat exchanger (not shown) into air supply tube 44.

For simplicity, the term "process stream 9" will be used to refer to engine exhaust stream 3, as well as any combination of air stream 4, supplemental fuel stream 5, reductant stream 7 (described below), and burner 29 combustion products (described below) as may be present within the oxidizer 10. The soot, products of incomplete combustion, and supplemental fuel (if any) within process stream 9 react with oxygen within a reaction zone 8 to form carbon dioxide and water vapor. The term "process stream 9" encompasses the corresponding products of the oxidation reaction that exit the flameless thermal oxidizer. The terms "reaction wave" and "reaction zone" are used interchangeably herein and in the appended claims.

Matrix 14a comprises a bed of solid, heat-resistant media through which process stream 9 passes. Matrix 14a encompasses a bed of any ceramic, metal, or other heat-resistant media, including: balls, preferably ¾" diameter; saddles, preferably 0.5" to 1.5" nominal size; pall rings; foam, preferably having a void fraction of approximately 90% and about ten to thirty pores per inch; and honeycomb.

Although the Figures generally use balls to symbolize the media, the present invention encompasses any combination of the above media types, whether separately or in combination of types and sizes, and whether randomly or structurally arranged. As will be described more fully below, the media may include an engineered matrix portion that has two or more flow control portions. The size and composition of the media are chosen to obtain a desired mean-free radiative path therein. The materials of the media are chosen according to their heat transfer properties. The size, composition, and material selections are determined to obtain a desired overall backward heat transfer characteristic.

Preferably, matrix 14a is supported by support members 21a and 21b on the matrix 14a inlet end and outlet end, respectively. Support members 21a and 21b, which may be formed of any material having a suitable operating temperature range, are porous so as to enable process stream 9 to flow therethrough. For media that does not require support, support members 21a and/or 21b may be omitted. The present invention also encompasses a matrix divided into separate sections that may contain different sizes and types of media, or that may be void of all media. Moreover, the present invention encompasses a reaction wave 8 formed in any of said sections, including a section void of all media. Matrix shell 22a houses matrix 14a and is coupled to support members 21a and 21b. Matrix shell 22a is preferably manufactured from steel plate forming a cylinder, but may comprise conventional heat-resistant and corrosion-resistant alloys. An insulation layer 23 and conventional corrosion-resistant layer (not shown) may be employed on the interior surfaces of matrix shell 22a as required for protecting shell 22a from high temperature and for thermal efficiency.

Inlet plenum 16a, which is formed by matrix shell 22a and support member 21a, is located on the upstream end of matrix 14a. Outlet plenum 18a, which is formed by matrix shell 22a and support member 22b, is located on a downstream end of matrix 14a. Plenums 16a and 18a may be open so as to form chambers, or may contain a matrix of porous media for enhancing heat recuperation and for promoting uniform velocity distribution. Although the preferred embodiment includes plenums 16a and 18a, the present invention encompasses an embodiment that lacks either or both plenums 16a and 18a.

Heater 28 may comprise an electric arc ignitor, a catalytic section 31 (discussed herein below) or, preferably, a resistive heating element or "glow plug" that protrudes into matrix 14a. Alternatively, heater 28 may be formed by an electrically conductive portion 15, preferably a metal foam, within matrix 14, through which electricity may pass so as to enable portion 15 to function simultaneously as a resistance heating element and as a portion of the reaction matrix. The electrically conductive portion 15 may be formed in any shape that is conducive to proper heat transfer and electrical function, including for example, an annular loop, an inner core, a planar layer and the like.

Although catalysts are generally ill-suited for use with gases containing soot (as described above), a catalyst may be employed in a low temperature region of the thermal oxidizer to ignite process stream 9 to form reaction wave 8 while diminishing the chances of thermal deactivation of the catalyst. Specifically, a catalytic section 31 may be positioned proximate the inlet of matrix 14a. The reaction wave 8 may form downstream from catalytic section 31, thereby enabling catalytic section 31 to maintain a temperature below the maximum operating temperature limit of the catalyst. Catalytic section 31 may be formed by a conventional catalytic material, such as a noble metal catalyst, disposed on a media. The catalyst may be of the type for catalyzing the reactions of carbon monoxide and unburned hydrocarbons with oxygen, as will be understood to those familiar with such catalysts.

As used in this specification and in the appended claims, the terms "heating the matrix" and "heating at least a portion of the matrix" includes heating matrix 14a and directly heating process stream 9, which in turn heats matrix 14a. Moreover, "heater 28" as used in this specification, and the terms "heater" and "heating" as used in the appended claims, refer to any device or method of increasing temperature of the matrix, or increasing the temperature or igniting process stream 9 or other streams, including but not limited to employing the resistive heating element, glow plug, electric arc ignitor, conductive portion 15, and catalytic portion 31 described in this application.

Heater 28, including all of the embodiments of heater 28 described above, may ignite process stream 9, thereby initiating the oxidation reaction and controlling stability and location of the reaction zone. The latter function is termed "wave holding" and the corresponding device is generally termed a "wave holder." Other wave holders (that is, in addition to heater 28) include injecting air, raw fuel, premixed air and fuel, and hot gas to control stability and location of the reaction zone, as will be described with the embodiments in which the particular wave holder is preferably employed. Heater 28 may also be used to augment the enthalpy of process stream 9, especially in embodiments in which another device ignites process stream 9.

Flameless thermal oxidizer 10a may also include a burner 29, which may be employed in at least two ways. First, burner 29 may initiate reaction of process stream 9 by preheating matrix 14a. Thus, burner 29 may be employed instead of heater 28. Second, hot gas stream 6 may be employed as a wave holder. Preferably, hot gas stream 6 is employed in systems in which engine 12 is a stationary engine. For convenience, FIGS. 2 through 10 omit heater 28 and burner 29, although it is understood that any device for initiating reaction within reaction wave 8 may be employed.

Control system 33 includes plural temperature sensors 30, controller 32, and means for adjusting flow rate (not shown) of any of the flow streams 4, 5, 6, and 9. Plural temperature sensors 30, for example three or four, preferably are thermocouples that protrude through matrix shell 22a into matrix 14a at successive locations along the flow path of process stream 9. Although thermocouples are preferred, temperature sensors 30 may comprise any transducer that forms a signal that represents temperature, including, for example, optical temperature sensors. Also, temperature sensors 30 encompass conventional sensors that sense the temperature of shell 22a rather than the temperature within matrix 14a Control system 33 may also include a means for adjusting the flow rate of engine exhaust stream 3 that reaches thermal oxidizer 10a by bypassing at least a portion of exhaust stream 3 around the oxidizer 10a. As shown in relief, the bypass includes a control valve 35 that is adjusted by controller 32.

Temperature sensors 30 communicate signals to controller 32, which comprises a programmable logic controller, an engine electronic system supplied by the engine manufacturer, and other control systems capable of accepting and interpreting signals from temperature sensors 30. Controller 32 controls the flow rate (if any) of engine exhaust stream 3, air stream 4, supplemental fuel stream 5, hot gas 6, and reductant stream 7 (as described herein below) by controlling the means for adjusting the respective flow rates. Such means for adjusting flow rate comprise any in-line dampers and valves, bypass systems, pumps, fans, and the like as will be apparent to persons familiar with such flow adjusting systems. Controller 32 may also control the operation of heater 28.

Figure 11:
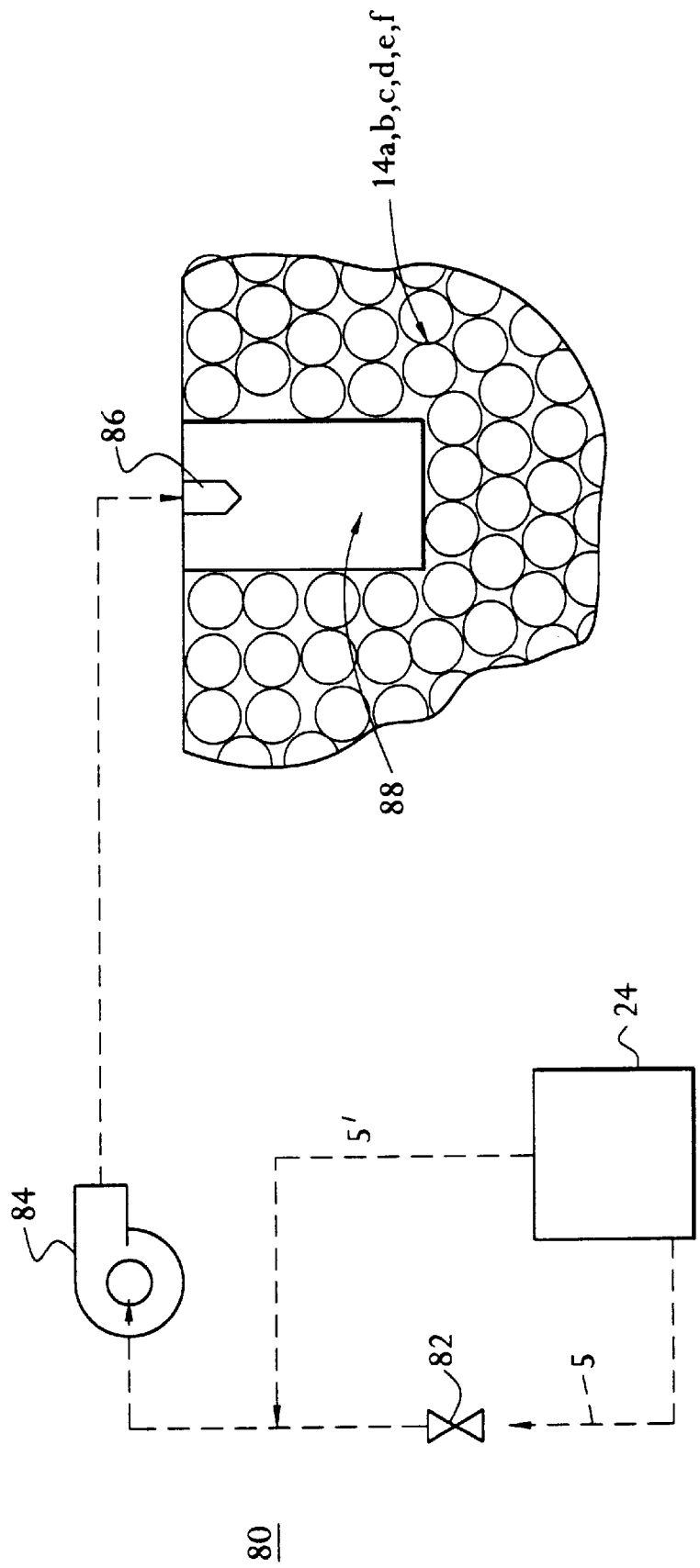
FIG. 11 is a schematic view of the fuel delivery system that may be employed on the flameless thermal oxidizer.

To deliver fuel stream 5 into flameless thermal oxidizer 10a, a delivery system 80, as illustrated in FIG. 11, comprises a fuel tank 24, a valve 82, a pump 84, a spray nozzle 86, and a fuel vaporization chamber 88. Valve 82 and pump 84 are operated by controller 32 so as to supply supplemental fuel stream 5 as required to control reaction wave 8. Spray nozzle 86 sprays fuel into chamber 88, which is disposed within thermal matrix 14a, either by mechanical or air atomization means. Methods and systems for preparing and delivering liquid fuel into a flameless thermal oxidizer have been described in U.S. patent application Ser. Nos. 08/789,271 (Heywood et al., filed on Jan. 28, 1997) and 08/729,850 (Heywood et al., filed on Oct. 15, 1996), each of which are incorporated herein by reference in their entirety and each of which are assigned to the assignee of the present invention.

Supplemental fuel stream 5 may include fuel vapor 5' and liquid fuel from fuel tank 24. The fuel vapor 5' that might otherwise escape from fuel tank 24 may be drawn from the tank by pump 84 or fed directly into flameless thermal oxidizer 10a. Alteratively, fuel vapor 5' may be vaporized or sparged from liquid fuel contained in fuel tank 24, preferably using process stream 9' after it exits from thermal oxidizer 10. Process stream 9 may be used to vaporize fuel in a separate device, or process stream 9 may be passed directly through fuel tank 24. Alternatively, supplemental fuel stream 5 may be vaporized by heating and combined with process stream 9 as further described below in this specification. Fuel tank 24 may be the vehicle fuel tank or a separate tank.

According to another aspect of the present invention, a system for the simultaneous destruction of soot and oxides of nitrogen in an engine exhaust stream 3 is provided. Referring to FIG. 1, a thermal oxidizer 10a includes a reductant delivery system 148 for injecting a reductant stream 7 into process stream 9. Preferably, reductant stream 7 is injected upstream from matrix 14a to enable reductant stream 7 to be heated by matrix 14a, and to enhance mixing. However, the present invention encompasses any means of injecting reductant stream 7, including for example injecting reductant stream 7 directly into matrix 14a, combining reductant stream 7 with air stream 4, fuel stream 5, and/or process stream 6 before introduction into the matrix, and pre-heater 150 (shown in phantom in FIG. 1).

Reductant delivery system 148 may comprise any conventional delivery system capable of delivering an adequate flow rate of reductant, as will be understood by those familiar with such systems and reactions. Specifically, reductant delivery system 148 may include, for example, a storage tank, a monitoring and alarm system, a metering system, emergency shut-off valves, a vaporization system, piping, controls, and the like. Reductant stream 7 may include a conventional reductant, including for example ammonia, ammonium formate, ammonium oxalate, ammonium carbonate, urea, cyanuric acid, iso-cyanate, hydrazine, ammonium sulfate, melamine, methyl amines, bi-urates, and the aqueous solutions thereof. U.S. Pat. No. 5,547,650 (Edgar), which is incorporated herein by reference, describes such techniques and explains how the reductant reacts with other compounds for destruction of NOx. Because reductant stream 7 typically produces an exothermic heat release when used as described herein, using a reductant may diminish the amount of supplemental fuel 5 required to reach the desired operating temperature.

For convenience, FIGS. 2 through 13 and the corresponding description may omit heater 28, burner 29, control system 33, matrix 14a, conductive portion 15a, inlet plenum 16a, and streams 3 through 7 (and the corresponding systems) although it is understood that the descriptions of the features 28, 29, 33, 14a, 15a, and 16a, as well as streams 3 through 7, may apply to each of the embodiments described in this specification and appended claims.

Referring to FIG. 1 to illustrate the first particular embodiment, process stream 9 enters inlet plenum 16a and flows in one pass through matrix 14a. Process stream 9 reacts within matrix 14a to form reaction wave 8. Process stream 9' exits matrix 14a through outlet plenum 18a, which is located at the opposing end from inlet plenum 16a.

Figure 2:
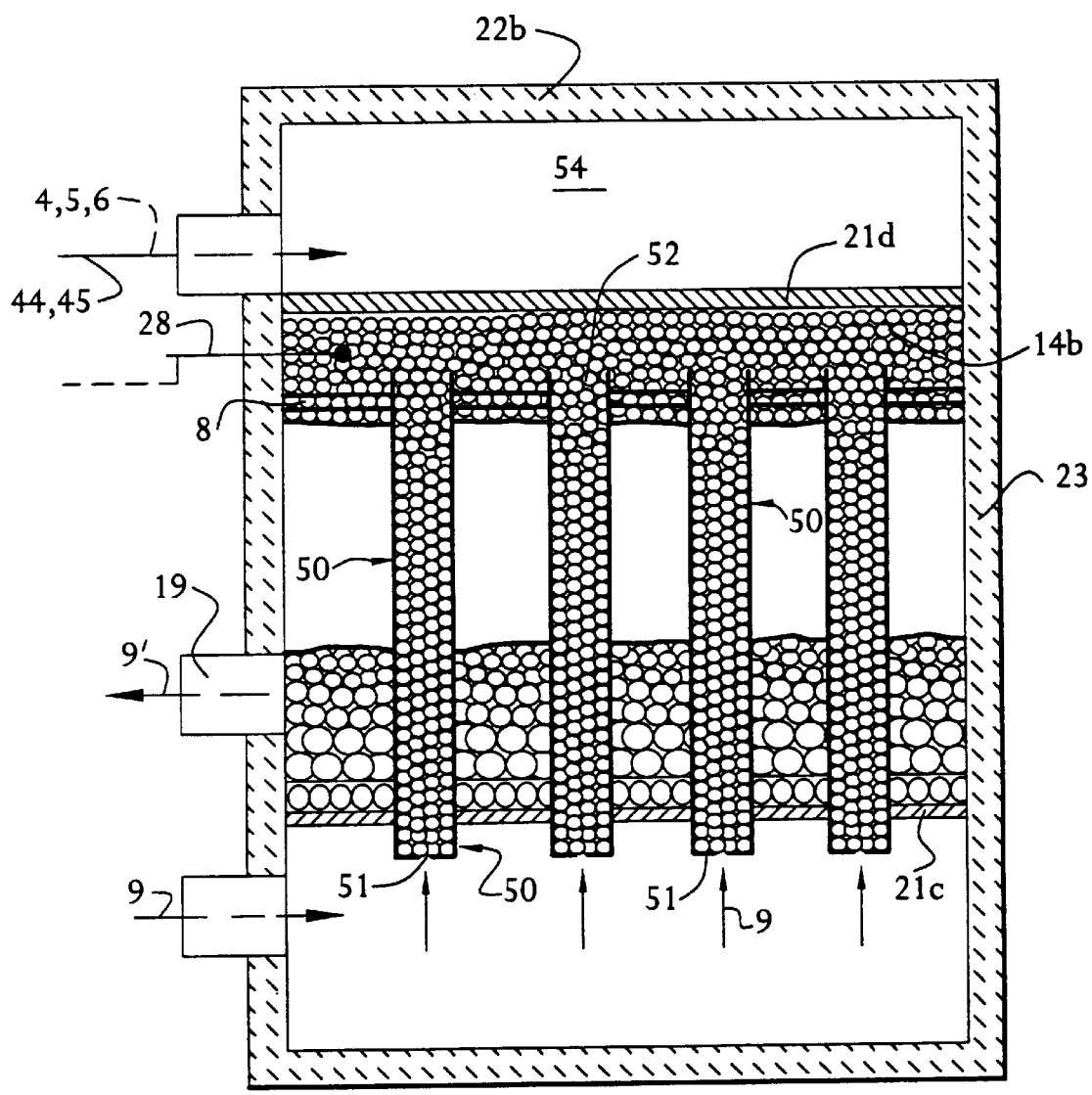
FIG. 2 is another embodiment of the flameless thermal oxidizer.

Referring specifically to FIG. 2, flameless thermal oxidizer 10b includes plural feed tubes 50, an intermediate plenum 54, a matrix 14b, support members 21c and 21d, a matrix shell 22b and an outlet 19. Additionally, the flameless thermal oxidizer may include an outlet plenum (not shown) disposed between matrix bed 14b and outlet 19. The quantity of feed tubes 50 will depend on the particular heat transfer characteristics, flow rates, and other process parameters of flameless thermal oxidizer 10b and process stream 9. However, many applications for mobile engines preferably have between one and five feed tubes 50, while stationary engine applications may have many more feed tubes. Each feed tube 50 has an inlet 51 for receiving process stream 9. Feed tubes 50 preferably contain porous media of the general type that has been described as forming the matrix, although the feed tubes 50 may lack media. Each feed tube 50 has an outlet 52 at an opposing end from inlet 51.

Intermediate plenum 54 is formed by shell 22b and an intermediate support member 21d. Support member 21d may be coupled to tubes 50 proximate tubes outlet 52 so as to enable flow communication from tubes 50 to intermediate plenum 54. Intermediate plenum 54 thereby receives process stream 9. Alternatively, tube outlet 52 may be embedded in matrix 14b, thereby causing flow stream 9 to flow through part of matrix 14b before communicating with intermediate plenum 54.

Heater 28, if employed, may be located within intermediate plenum 54 or, preferably, within matrix 14b. In addition to heater 28, other devices may be employed for wave holding, igniting process stream 9, and increasing enthalpy of process stream 9. For example, hot gas stream 6 from burner 29 and/or supplemental fuel stream 5 may be added to matrix 14a, and preferably into intermediate plenum 54. Supplemental stream 5 may be added according to any technique described herein above. Similarly, air tube 44 and supplemental fuel tube 45 may be coupled to intermediate plenum 54 so as to feed air stream 4 and supplemental fuel stream 5 into intermediate plenum 54, although tubes 44 and 45 may be coupled so as to feed into center tubes inlet 51. Air tube 44 and supplemental fuel tube 45 may alternatively be coupled to matrix shell 22b so as to feed air stream 4 and fuel stream 5, respectively, directly into matrix 14b, thereby anchoring reaction wave 8.

Matrix 14b encompasses the space within matrix shell 22b around the exterior of center tubes 50. Process stream 9 flows into each center tube inlet 51, through center tube 50, from tube inlet 52, and through matrix 14b and outlet 19. Streams 4, 5, and/or 6 flow from intermediate plenum 54 though support member 21d, through matrix 14b and through outlet 19. Alternatively, the present invention encompasses the flow direction within thermal oxidizer 10c being reversed (not shown) such that process stream 9 flows into outlet 19, through matrix 14b, into tube 50 through outlet 52, and out of tube 50 through inlet 50.

Referring to FIG. 3, which illustrates a third embodiment, flameless thermal oxidizer 10c includes a center tube 60, an outer plenum 68, a matrix 14c, and a matrix shell 22c. Center tube 60 may contain media of the type generally described as forming a matrix 14a, and has an inlet 61 and plural exit ports 62 that are distributed around the circumference and longitudinally along the length of center tube 60. Matrix 14c is disposed within an annulus that is created by matrix shell 22c and the exterior of center tube 60. Matrix shell 22c has plural radial holes 64, as shown in FIG. 4, located around the circumference and longitudinally along the length of shell 22c for enabling process stream 9 to pass therethrough. Outer plenum 68 is defined by a plenum shell 69, which substantially forms an annulus around matrix shell 22c. Plenum shell 69 has an outlet 19 (not shown). Process stream 9 flows longitudinally through center tube 60, and flows radially through ports 62, matrix 14c, matrix holes 64, and into outer plenum 68.

Referring to FIG. 5, flameless thermal oxidizer 10c may include a plurality of longitudinal tubes 70 arranged substantially to form a cylinder around matrix 14c, thereby replacing at least a portion of matrix shell 22c. A heat recovery fluid 71, for example steam or water, flows through the interior of tubes 70, as shown in FIG. 6, so as to recover heat from process stream 9. Tubes 70 may also be employed in partial replacement of matrix shell 22a,b in the embodiments shown in FIGS. 1 and 2. However, tubes 70 are preferably employed with flameless thermal oxidizer 10c having a radial flow that may pass approximately perpendicular to the long axis of tubes 70. Moreover, tubes 70 are preferably employed with stationary engines 12 so as to more easily utilize the heat recovery fluid.

Figure 7:
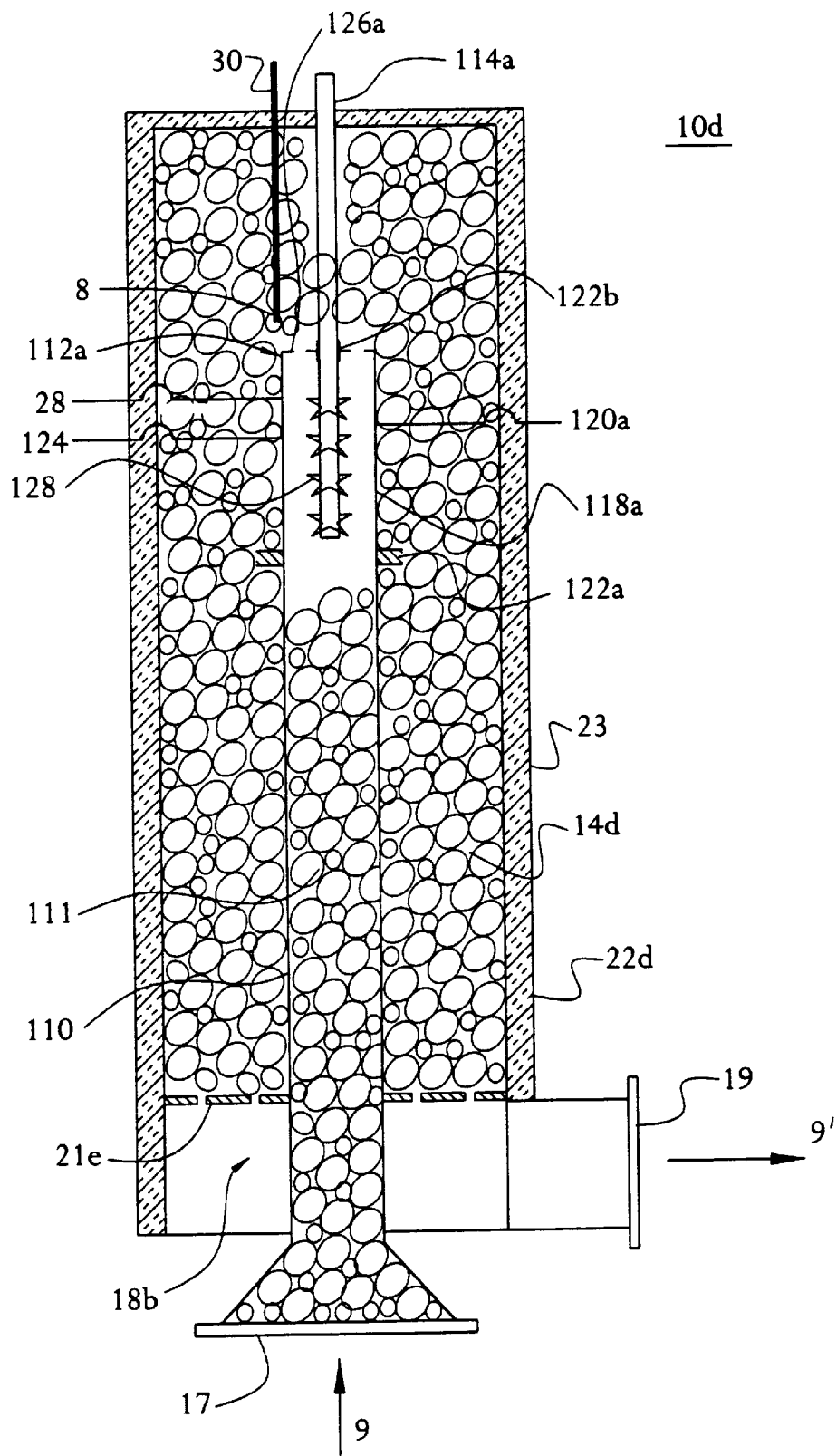
FIG. 7 is a thermal oxidizer employing an electrostatic precipitation system according to the present invention.
Figure 8:
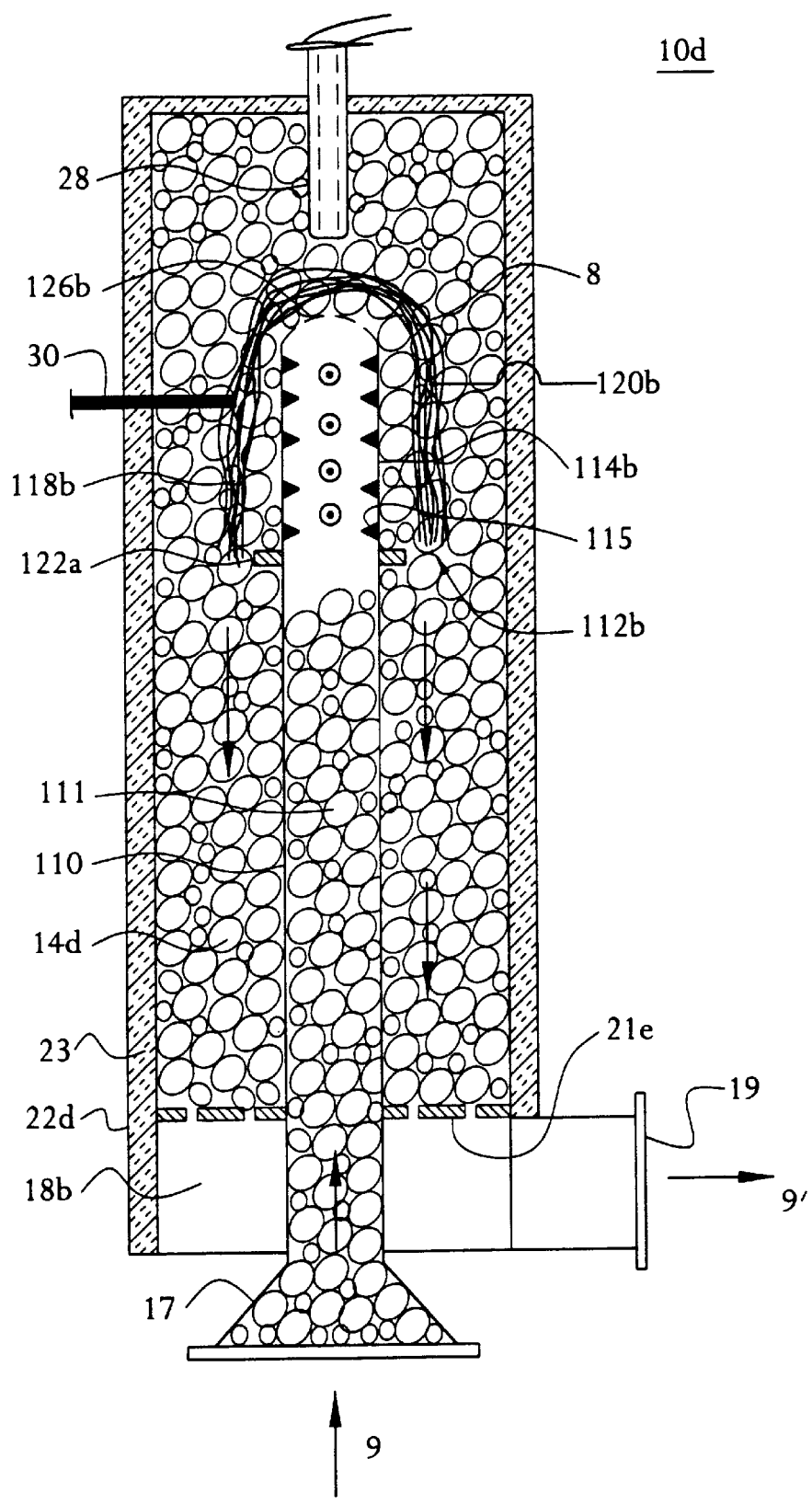
FIG. 8 is a thermal oxidizer employing another embodiment of the electrostatic precipitation system.

Referring to FIG. 7, according to an aspect of the present invention, a thermal oxidizer 10d that employs an electrostatic technique for increasing particle residence time is provided. Thermal oxidizer 10d includes a matrix 14d, a shell 22d, a feed tube 110, and an electrostatic precipitator system 112a. Preferably, as shown in FIGS. 7 and 8, matrix 14d forms an annulus around feed tube 110, which consists of a single, center feed tube 110. Preferably, a center tube packing 111, which is similar to the media that has been described as forming the matrix, may be disposed within tube 110. Shell 22d encloses matrix 14d except at one end at which a support member 21e permits process stream 9 to flow therethrough. Shell 22d and support member 21e form an outlet plenum 18b, which as an outlet 19. Center feed tube 110 has an inlet 17.

The term "precipitator" and "collection" are used herein conform to accepted terminology for recognizable devices or components. Although it is understood that some particles will actually be collected on collection member 118a,b, the preferred method of operation of electrostatic precipitator 112a,b is to increase particle residence time within the flameless thermal oxidizer 10d without collecting such particles on collection member 118a,b, as will be described more fully below.

Electrostatic precipitator system 112a comprises a discharge electrode 114a and a collection member, such as a collection tube 118a, that is disposed within matrix 14d and is coupled to an end of feed tube 110. Collection tube 118a is preferably electrically-coupled to a collection electrode 120a that preferably has a positive polarity, and that is opposite that of discharge electrode 114a. Alternatively, collection tube 118a may be connected to an electrical ground (not shown). Collection tube 118a is electrically isolated and coupled to center tube 110 by an electrical insulator 122a. Collection tube 118a may also include a tube heater 124. Thermal oxidizer 10d may also include a heater 28.

Collection tube 118a has a perforated end plate 126a disposed on its downstream side that prevents media of matrix 14d from falling into the collection tube 118a while permitting process stream 9 to flow through the perforations of end plate 126a. Discharge electrode 114a is a rod-type electrode, preferably having a negative polarity, that is affixed to shell 22d. Discharge electrode 114a protrudes through matrix 14d into collection member 118a, and is isolated and coupled with end plate 126 by an electrical insulator 122b. Preferably, discharge electrode 114a produces an electrical corona discharge 128 of a "star" type shape, although the present invention encompasses employing electrodes that create an electric field without a corona discharge.

Referring to FIG. 8, another embodiment of the electrostatic precipitator system 112b includes a discharge electrode 114b and a collection member 118b disposed within matrix 14d. Discharge electrode 114b is a tubular discharge electrode that is electrically isolated and coupled with center feed tube 110 by insulator 122a. Discharge electrode 114b includes numerous discharge points 115 projecting from an inside surface. The quantity and location of the discharge points 115 will vary according to the size and process parameters of thermal oxidizer process, as will be clear to those familiar with such electrodes and parameters. Discharge electrode 114b also has a perforated end plate 126b disposed on the downstream end of the tube 114b.

Collection member 118b is an open wire mesh that is either grounded or possesses a polarity opposite that of the discharge electrode tube 114b. To provide such a polarity, collection member 118b may be coupled to a collection electrode 120b. Preferred polarities of electrodes 114b and 120b are the same as electrodes 114a and 120a, which are described with reference to FIG. 7. Also, the void within collection tube 118a and collection member 118b may include media to enhance heat transfer. Similarly, the discharge electrode 114a,b and/or collection member 118a,b may be formed of a metal media to enable heating and reacting to occur simultaneously with the electrostatic functions.

Figure 9:
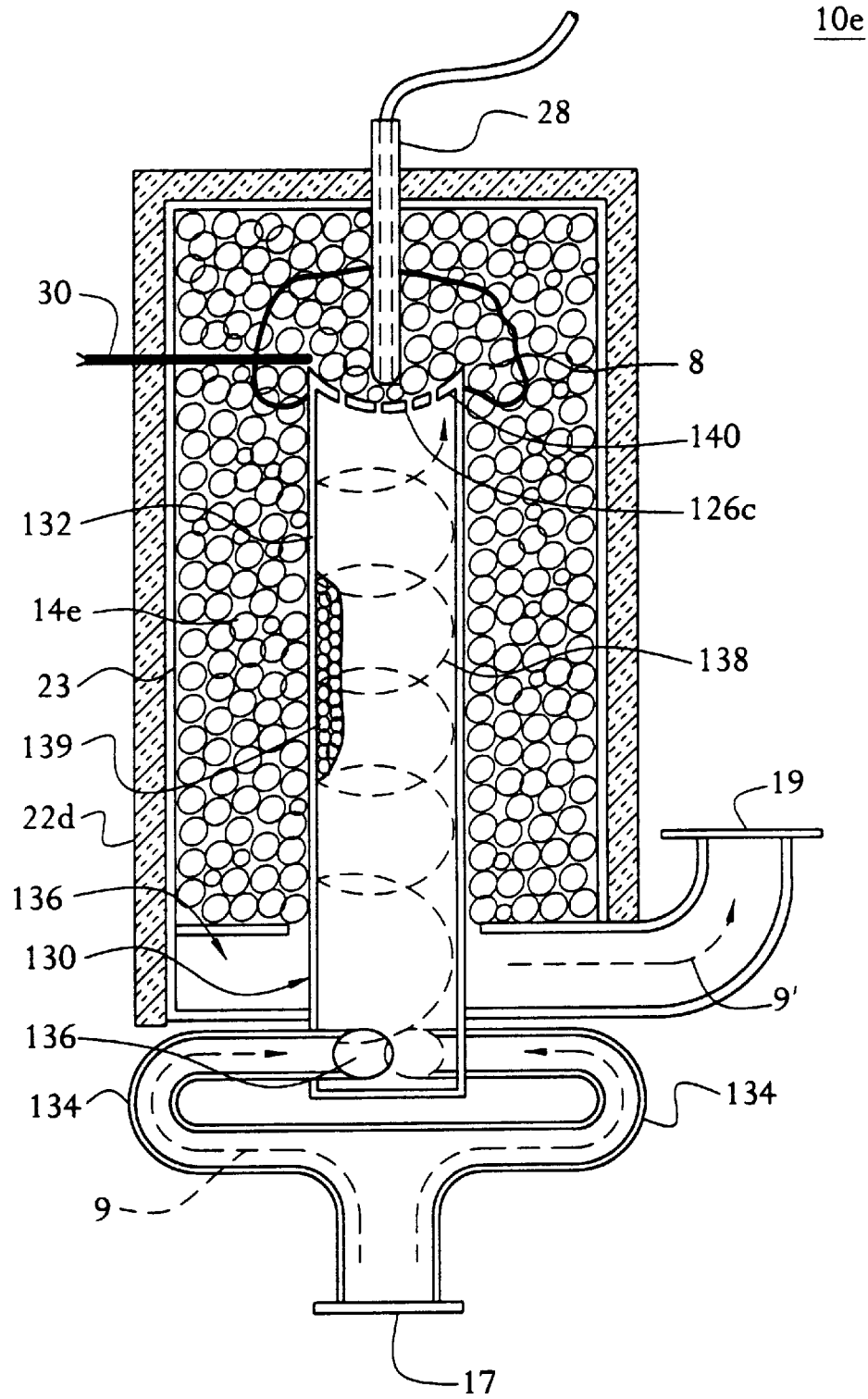
FIG. 9 is a thermal oxidizer employing a cyclone section according to the present invention.

Referring to FIG. 9, a thermal oxidizer 10e that includes a cyclone system 130 illustrates the application of centrifugal force to increase particle residence time within a thermal oxidizer. Thermal oxidizer 10e is arranged similar to thermal oxidizer 10d, except cyclone system 130 replaces electrostatic precipitator system 112a,b within a matrix 14e. Cyclone system 130 comprises a cyclone tube 132 that has an inlet 17, an inlet tube 134, an end plate 126c, and a particulate trap 140.

Inlet tube 134 preferably comprises plural tubes, preferably two, that split the process stream 9 into two streams. Inlet tubes 134 are attached around a circumference of cyclone tube 132 at tangential inlets 136. Preferably, inlets 136 are tangentially attached to tube 132, although any offset attachment (that is, not in-line with the tube longitudinal center line) that promotes swirl may be employed. Also, cyclone tube 132 may have turning vanes (not shown) disposed therein to impart or enhance swirl. Cyclone tube 132 includes a perforated end plate 126c that preferably has a concave shape. At its perimeter, end plate 126c forms an acute angle with cyclone tube 132, thereby forming particulate trap 140.

Figure 10:
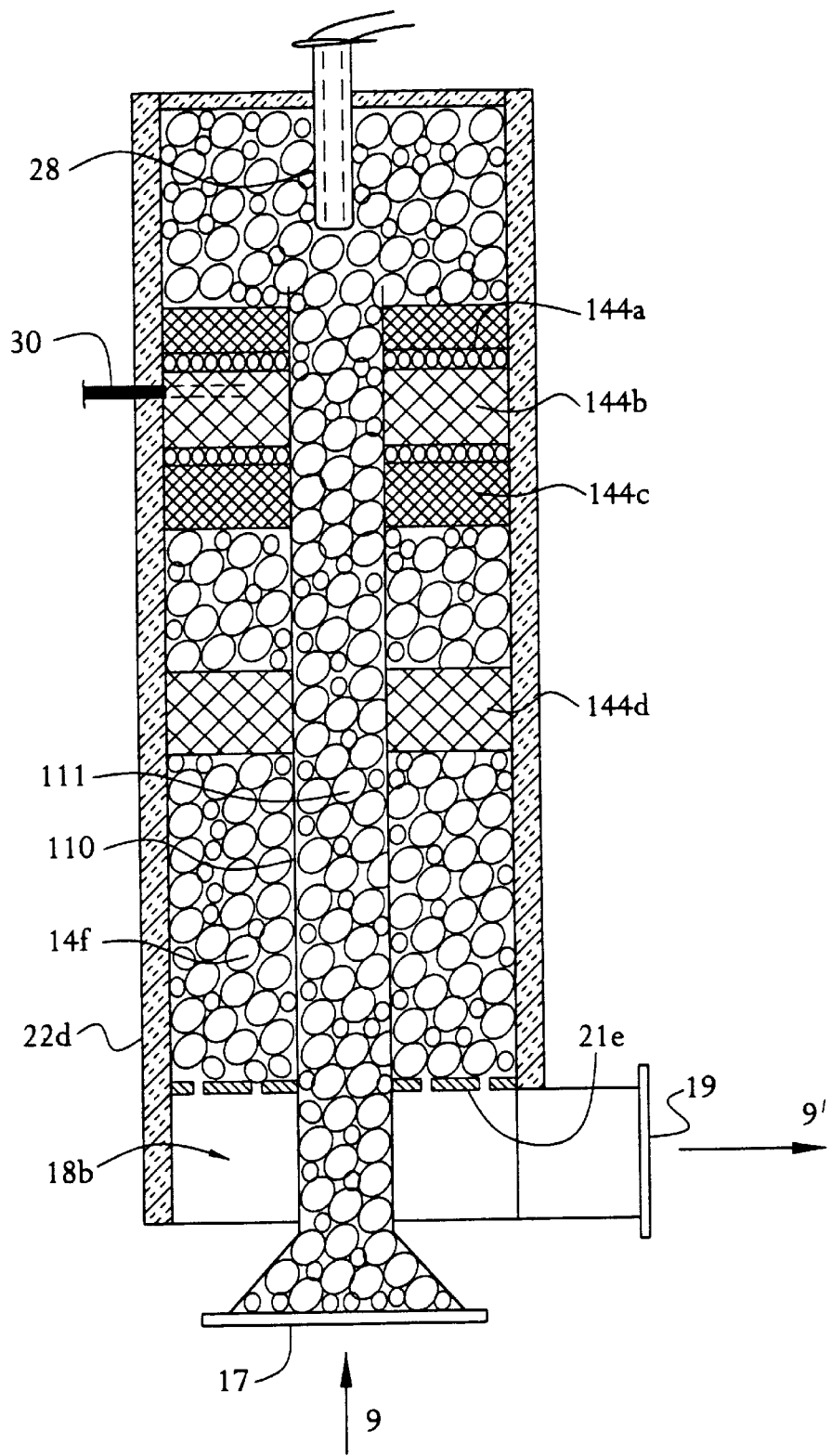
FIG. 10 is a thermal oxidizer according to one embodiment of the present invention employing a series of progressively smaller filters.

According to another aspect of the present invention, a thermal oxidizer 10f may employ a series of particle impaction sections 144a,b,c,d of the matrix 10a that have progressively smaller pore sizes in the downstream direction. Referring to FIG. 10, thermal oxidizer 10f employs particle impaction sections 144a,b,c,d annularly disposed around a center feed tube 110 within a matrix 14f. Alternatively, particle impaction sections 144a,b,c,d may be employed with other embodiments of thermal oxidizer described herein and in the appended claims.

Particle impaction section 144a, because of its pore size, has the greatest propensity for retarding particles of a given diameter, for example approximately 10 micron, and is located farthest upstream. Next (referring to a downstream direction) is particle impaction section 144b, which may have a pore size of, for example, four to six microns. Particle impaction section 144c and 144d may have pore sizes capable of retarding particles of, for example, approximately three to four microns and one to two microns, respectively. The actual pore sizes of particle impaction section 144a,b, c,d will vary according to thermal oxidizer process parameters, including acceptable engine back pressure, desired DRE, temperature, and the like, as will be understood by those familiar with the thermal oxidizer process parameters.

The present invention also encompasses a method for reducing soot emissions in an engine exhaust stream. Referring again to FIG. 1, now to illustrate the present inventive method as well as generally to describe the operation of the apparatus described above, an engine exhaust stream 3 is directed into matrix 14a. Engine exhaust stream 3 includes products of incomplete combustion and, preferably, soot. Although the operation below is described with reference to the embodiment of the invention shown in FIG. 1, for brevity and convenience the description applies to other embodiments shown in other figures.

The present invention is especially effective on engine exhaust that contains high concentrations of soot, although the invention is equally applicable to an exhaust stream that lacks a soot component. To augment the heating value of engine exhaust stream 3, a supplemental fuel stream 5 may be combined with exhaust stream 3. Also, an air stream 4 may be combined with engine exhaust stream 3 and the supplemental fuel stream 5, if any, so as to supply oxygen for enabling the reaction of process stream 9 within the thermal oxidizer. Similarly, a hot gas stream 6 may be added to raise the sensible enthalpy of process stream 9.

Conventional diesel engines typically provide an exhaust stream having a higher oxygen content than conventional gasoline engines. Therefore, it is likely that the flow rate for air stream 4 will be larger for systems in which engine 12 is a gasoline engine. The present invention also encompasses destroying fuel vapor 5' from a vehicle fuel tank that may otherwise escape to the atmosphere. Directing such fuel vapor 5' to combine with process stream 9 augments the heating value of process stream 9.

The temperature of process stream 9 increases as process stream 9 flows through interstitial spaces within matrix 14a. Upon reaching its autoignition temperature, which is typically near 1400° F., reactive components within process stream 9 combine with oxygen within a zone that defines reaction wave 8. These reactive components include the products of incomplete combustion, soot, supplemental fuel, and fuel tank vapors. Although the reaction of the gaseous components of process stream 9 will be substantially complete at the back end of the reaction wave 8, some soot particles may continue to react with oxygen outside of reaction wave 8. Similarly, depending upon the embodiment used, some soot particles may adhere to the media 14a, collection members 114a,b, cyclone tube 132, or particle impaction sections 144a,b,c,d until substantially complete burnout of the particle is achieved. Process stream 9 flows though the back end of matrix 14a until exiting flameless thermal oxidizer 10a through outlet 19.

The media on the inlet side of reaction wave 8 is primarily heated by inner-body, backward-propagating radiation. The incoming process stream 9 is primarily heated by convection from the media to the gas. A high soot content within process stream 9 may improve heat transfer from the media to process stream 9 by increasing radiative absorptivity of process stream 9. Within reaction wave 8, convective and radiative heat transfer from the reaction wave to the media retards the creation of thermal NOx, thereby diminishing the NOx content of the process stream 9 compared with open flame combustion.

The heat transfer characteristics of the flameless thermal oxidizer 10a may be varied by employing a matrix of different materials and sizes so as to change: the radiative properties, including the mean free radiative path and emissivity; the convective properties, including matrix surface area per unit volume and geometry; and the conductive properties, including thermal conductivity coefficients and heat capacities. Moreover, an interface or several interfaces between the matrices or hollow zones may be employed so as to anchor reaction wave 8.

Reaction of process stream 9 may be initially begun by subjecting matrix 14a to a heater 28 of any type described herein. For example, the reaction may be initiated by subjecting process stream 9 to a temperature above its autoignition temperature by exposing process stream 9 to a spark device or electric resistance heater, by pre-heating a portion of the media with a burner 29, by utilizing conductive portion 15 as a resistive heating element, or by partial catalysis within catalytic portion 31. The present invention encompasses utilizing burner 29 to produce an open flame within matrix 14a to initiate the reaction, but such open flame initiation is not preferred.

After initiation, the reaction wave 8 is substantially self-sustaining within matrix 14a. The reaction may be controlled, and the location of the reaction wave 8 determined and adjusted, by adjusting flow rates in response to temperature measurements. For this purpose, temperature sensors 30 sense a series of temperatures along the flow path of process stream 9. Air stream 4, supplemental fuel stream 5, and hot gas stream 6 may each be adjusted in response to the temperature readings. Moreover, heater 28 and/or conductive portion 15 may be controlled, and supplemental fuel stream 5 may be injected into matrix 14a downstream of inlet 17 so as to anchor reaction wave 8. Temperature sensors 30, controller 32, and flow adjusting means (not shown) are provided to achieve control of reaction wave 8.

Referring to FIG. 2, the present invention employs passing process stream 9 through plural feed tubes 50 that are disposed within matrix 14b. Employing feed tubes 50 enhances heat transfer from the downstream side of reaction wave 8 to the incoming process stream 9. Because the temperature of process stream 9 increases as process stream 9 reacts within reaction wave 8, heat is convectively and radiatively transferred from the high temperature portion of process stream 9 to matrix 14b. Matrix 14b transfers heat, primarily by radiation, to feed tubes 50, which transfers heat to incoming process gas 9 by two mechanisms. First, heat is transferred from tube 50 directly to incoming process stream 9 through convection. Second, feed tubes 50 radiate thermal energy to the media disposed within feed tubes 50, and the media transfer heat to incoming process stream 9 by convection. Additionally, the present method encompasses employing intermediate plenum 54 to combine hot gas 6 and/or supplemental fuel stream 5 with process stream 9, and initiating the reaction within intermediate plenum 54. Although air stream 4 also may be supplied to intermediate matrix 54, it is preferable to pass air stream 4 through feed tubes 50.

Referring to FIG. 3, process stream 9 may be directed longitudinally through a center tube 60 and then radially though ports 62 on the circumference of tube 60. Process stream 9 flows radially through matrix 14c, within which it forms a substantially cylindrical reaction wave 8. Process stream 9 radially exits matrix 14c through holes 64 disposed on the circumference of matrix shell 22c, enters an outer plenum 68, and exits flameless thermal oxidizer 10c through outlet 19. Alternatively, flameless thermal oxidizer 10c may employ heat recovery tubes 70, which are arrayed to form a cylinder, in place of matrix shell 22c, as shown in FIGS. 5 and 6. Thus, process stream 9 may transfer heat to tubes 70.

In another aspect of the present invention, illustrated in FIGS. 7, 8, and 9, means for selectively increasing residence time of particles within the thermal oxidizer are provided. Such increased residence time enhances burnout of the soot without increasing the gas residence time, thus, keeping the device as small as possible. Particles within process stream 9 may be collected by collection member 118a,b or cyclone tube 132. Collected particles will increase in temperature until they pyrolize or oxidize, or until they mechanically separate from the surface and are re-entrained in process stream 9. Other particles may migrate to collection member 118a,b or cyclone 132 such that they are not collected thereon, but decrease in effective velocity. Such velocity decrease enhances efficiency because such particles have a greater time period in which to absorb heat. The smaller particles that avoid collection altogether are least important from a process standpoint because these smaller particles require less residence time to be destroyed.

Referring to FIGS. 7 and 8, process stream 9 flows into inlet 17 through the packing media 111 of tube 110, in which process stream 9 increases in sensible enthalpy. Process stream 9 flows through electrostatic precipitator system 112a,b, in which discharge electrode 114a,b imparts a charge, preferably negative, onto the particulate component of stream 9. These negatively charged particles are attracted by positively charged collection member 118a,b. Referring specifically to FIG. 7, rod-type electrode 114a charges particles with stream 9, which are attracted across the flow stream lines to collection tube 118a. Because collection tube 118a is heated by tube heater 124, particles that adhere to collection tube 118a may oxidize thereon. The particles may also pyrolyze or partially oxidize on the surface of collection tube 118a, and fully react within reaction zone 8. Referring specifically to FIG. 8, the tube-type electrode 114b imparts a negative charge onto the particles, which are attracted to the positively charged wire mesh 118b. Preferably, heater 28 is disposed proximate an upstream portion of the wire mesh 118b so as to initiate the oxidation reaction of particles disposed thereon. Typically, particles in gas stream 3 have a range of charges, even if the composite polarity is neutral. Therefore, the particles may be attracted to oppositely charged collection members 118a,b and discharge electrode 114a,b may be eliminated. Collection tube 118a may be divided into oppositely charged, insulated sections or additional collection members (not shown) may be provided. Similarly, collection member 118a may be divided into oppositely charged, insulated wire mesh sections or additional wire mesh collection sections (not shown) may be provided.

Referring again to FIGS. 7 and 8, process stream 9, having increased enthalpy resulting from oxidation, flows counter-current to the flow within collection tube 110, thereby transferring heat thereto as described herein. Process stream exits matrix 14d through support member 21e, and through outlet plenum 18b and outlet 19.

Referring to FIG. 9, process stream 9 enters inlet 17 and splits to flow through inlet tubes 134. The tangential inlets 136 disposed around the circumference of cyclone tube 132 impart onto stream 9 an angular velocity, which is also commonly referred to as swirl or a vortex 138. The vortex 138 imposes centrifugal force onto the particles within process stream 9, which causes the particles to move outward across the flow streamlines. The larger the particle, the more effective cyclone system 130 will be, as is described more fully below.

Particles that contact cyclone tube 132 may adhere to the wall. Particles that are entrained in the process stream near the outlet of cyclone tube 132 may contact particulate trap 140, likely because of inertial impaction. Particles that adhere to either the wall of cyclone tube 132 or to particulate trap 140 may pyrolyze and oxidize. Gases and particles that escape collection by cyclone system 130 exit cyclone tube 132 through end plate 126c, where a heater 28 ignites the flow to form reaction zone 8.

Because cyclone system 130 is more effective on larger, more massive particles than smaller particles (especially less than approximately one to three micron diameter), cyclone tube 132 will likely collect mostly larger particles and the smaller particles will likely remain entrained in process stream 9. This phenomenon limits the ultimate effectiveness of cyclone system 130, and makes employing electrostatic precipitator system 112a,b the preferred method for increasing particle residence time for internal combustion engines. However, cyclone system 130 may be preferred in other applications because of its relatively simple design. Further, cyclone system 130 improves efficiency of thermal oxidizer 10e because cyclone system 130 efficiently collects larger particles (especially greater than 5 micron diameter), which require the largest residence time.

A media layer 139, partially shown in relief in FIG. 9, may be disposed on the inside surface of cyclone tube 132 so that particles that are re-located out of the stream to near the wall of tube 132 will be oxidized by the hot media layer 139. Media layer 139 may be comprised of the material that has been described as forming the matrix.

Referring to FIG. 10, process stream 9 flows through packing 111 within tube 110. Heater 28 ignites process stream 9 proximate particle impaction section 144a. Particles that are too large to pass through particle impaction section 144a remain thereon either until the particle is completely oxidized or until the particle has been sufficiently diminished in size to pass through particle impaction section 144a. The capture process is repeated for particle impaction sections 144b, 144c, and 144d.

The substantially planar reaction waves 8 and substantially cylindrical reaction wave 8 illustrated in FIGS. 1 and 2, and FIG. 3, respectively, are each formed from a pre-mixed process stream 9 in plug flow. The method according to the present invention encompasses forming reaction waves having other shapes. Specifically, any of the embodiments, especially those illustrated in FIGS. 1, 2, and 3, may also include internal flow devices for changing the shape of reaction wave 8. Thereby, the reaction rate within reaction wave 8 may be enhanced. The flow devices encompass, for example, piping systems for delivering components of process stream 9 to certain locations within matrix 14a,b,c,d,e,f, dampers, obstructions, venturis, separate inlets for separate components, engineered matrices (discussed more fully herein below), and the like for modifying flow patterns or the velocity profile within matrix 14a,b,c,d,e,f. Such flow devices are preferably employed upstream of reaction wave 8.

Figure 12A:
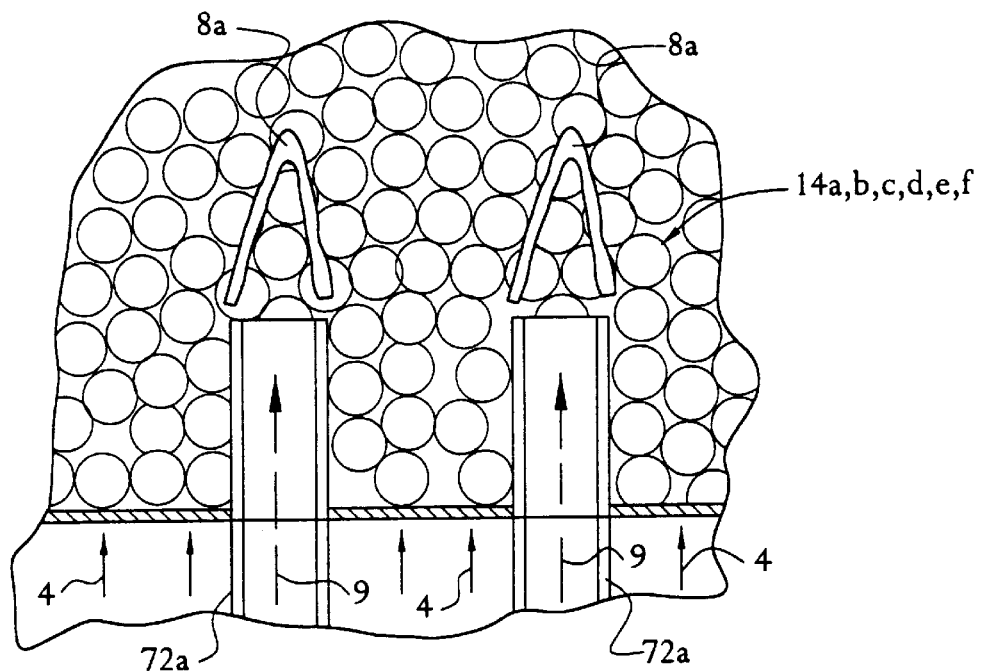
FIGS. 12A, 12B, and 12C illustrate the Bunsen, Burke-Schumann, and inverted V reaction waves, respectively, as might be created in the flameless thermal oxidizers of the present invention.

The flow devices are directed to forming reaction wave 8 of the following types: Bunsen, Burke-Schumann, and inverted V. FIG. 12A illustrates a Bunsen reaction wave 8a, which is formed by pre-mixed process stream 9. The term "pre-mixed," as used herein, refers to a stream of gas and particulate matter that has a nominally or substantially uniform composition throughout the stream at the relevant location. Pre-mixed process stream 9 encompasses any combination of exhaust stream 3, air stream 4, supplemental fuel stream 5, and hot gas stream 6 that are combined in such a manner and location so as to form a substantially uniform concentration of each constituent throughout process stream 9. As pre-mixed process stream 9 expands into matrix 14a,b,c,d,e,f upon exiting a supply tube 72a, reaction wave 8a is formed. To enhance the reaction within reaction wave 8a, an additional reaction air stream 4 may be supplied to matrix 14a,b,c,d,e,f, such that pre-mixed process stream 9 encounters additional air stream 4 upon entering matrix 14a,b,c,d,e,f.

Figure 12B:
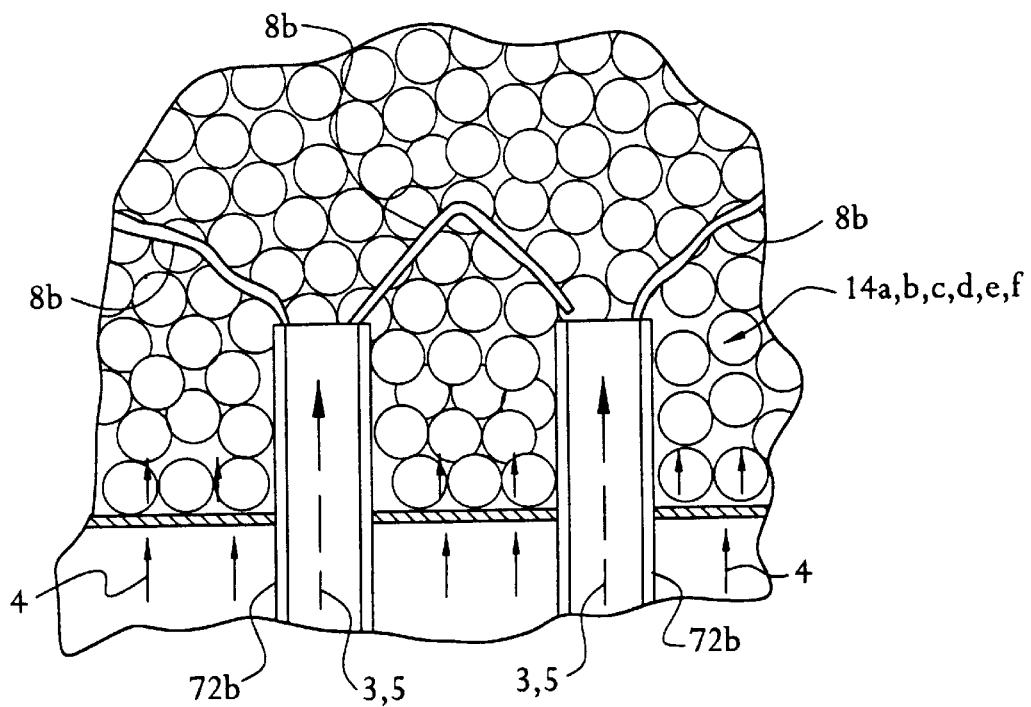

FIG. 12B illustrates a Burke-Schumann reaction wave 8b, in which exhaust stream 3 and supplemental fuel stream 5 flow through supply tube 72b separate from air stream 4. The reaction proceeds primarily at the outer boundary of reaction wave 8b according to a diffusion process.

Figure 12C:
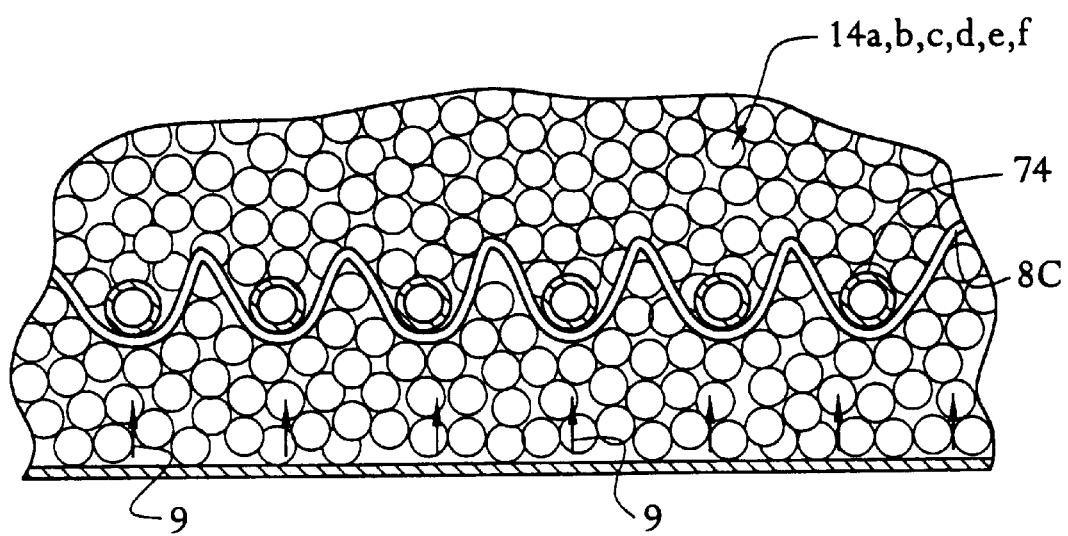

FIG. 12C illustrates an inverted V reaction wave 8c, which employs flow obstruction 74 to manipulate the velocity profile of process stream 9. Flow obstruction 74 may comprise plates, rings, venturis, and other structures of suitable material that impede the flow of a portion of process stream 9 within matrix 14a,b,c so as to act as bluff body stabilizer where recirculation eddies can bring hot products into the fresh gas mixture. Because media surrounding flow obstruction 74 may diminish the stabilizer effects, a pilot or raw fuel jet type waveholder may be used to form the inverted V reaction wave 8c. Similarly, such a waveholder may be formed integrally with flow obstruction 74. Waveholders are described in co-pending U.S. patent application Ser. No. 08/921,815, which is incorporated below. Although FIGS. 12A, 12B, and 12C illustrate reaction wave forms 8a, 8b, and 8c, respectively, employed by a flameless thermal oxidizer having substantially longitudinal flow, the present invention encompasses reaction waves 8a, 8b, and 8c that are formed within flameless thermal oxidizers having radial flow, as will be apparent to those familiar with such devices.

Figure 13:
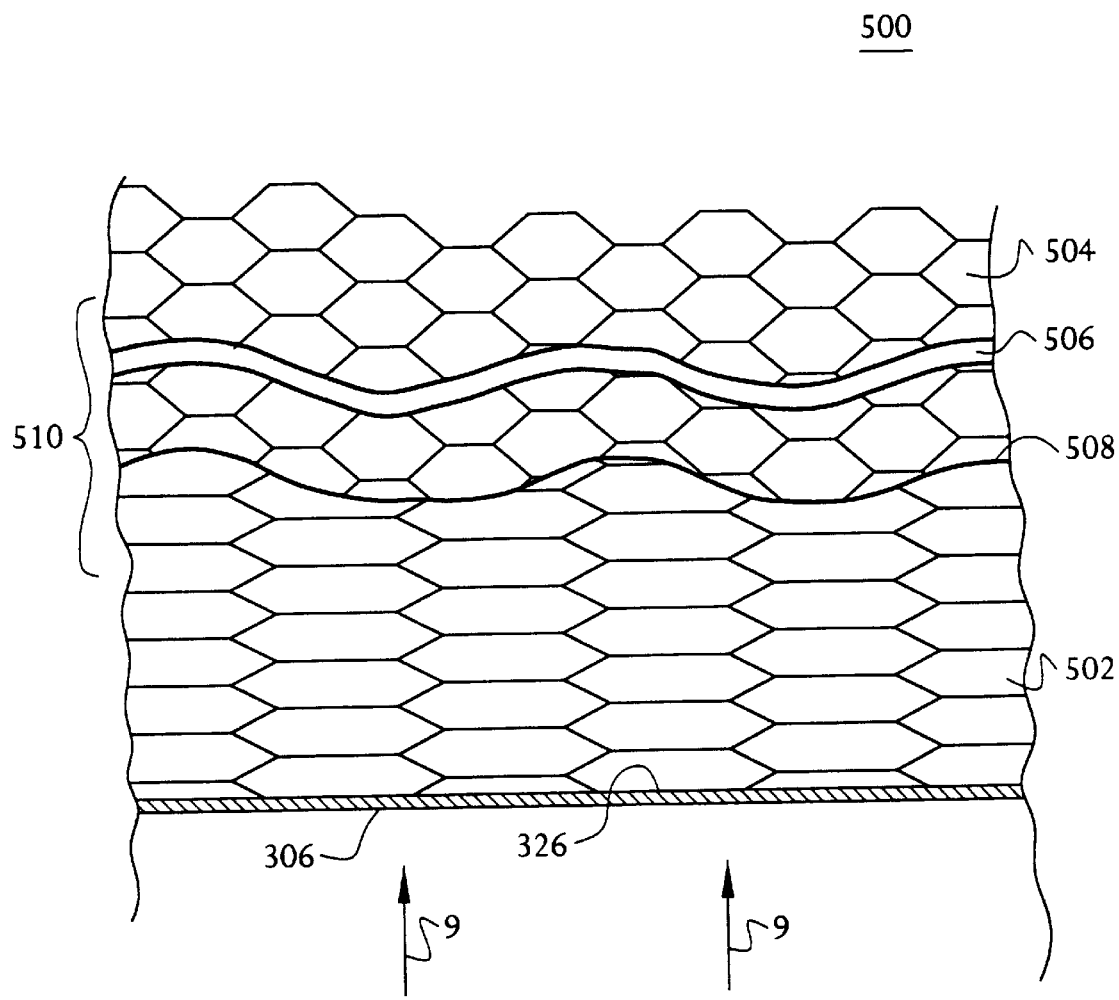
FIG. 13 is a view of the engineered matrix according to another aspect of the present invention.

Referring to FIG. 13, a technique for forming a matrix, and thereby forming the shape of the reaction wave 8, is provided. Co-pending U.S. patent application Ser. No. 08/921,815, filed on Sep. 2, 1997, entitled "Matrix Bed For Generating Non-Planar Wave Fronts, And Method Thereof," which is assigned to the assignee of the present invention and is incorporated herein by reference in its entirety, describes engineered matrices. An engineered matrix bed 500 with a first flow control portion 502 and a second flow control portion 504 forms a non-planar reaction wave front 506. The engineered matrix bed 500 may be made out of any suitable heat-resistant material. In the embodiment of FIG. 13, the first flow portion 502 has a relatively high interstitial linear gas velocity characteristic and the second flow portion 504 has a relatively low interstitial linear gas velocity characteristic. A interstitial linear gas velocity characteristic is the propensity of a gas flowing through the matrix bed to have a certain interstitial linear velocity. The first and second flow portions 502 meet a convoluted interface 508 that extends approximately parallel with the surface 326 of the first flow portion 502.

The shape and interstitial linear gas velocity characteristics of the engineered matrix bed portions 502 and 503 are such that the reaction wave front 506 approximates the shape of the interface 508 between the portions when the reaction portion 510 of the matrix bed 500 is in the vicinity of the interface 508. During operation of the engineered matrix bed 500, the stream 9 enters the first flow portion 502 through the surface 326 and flows to the interface 508. The reaction portion 510 of the matrix bed 500, which has been pre-heated to above the autoignition temperature of the stream 9, extends from just upstream of the interface 508 to just downstream of the interface 508. Stream 9 oxidizes in the reaction portion 510 in a reaction wave front 506. FIG. 13 shows the non-planar reaction wave front 506 just downstream of the interface 508 and in the approximate shape of the interface 508.

By positioning the reaction portion 510 of the matrix bed 500 in the vicinity of the interface 508, the shape of the front 506 approximates the contours of the interface 508. Portions of the front 506 that drift into the first flow portion 502 are blown back to the interface 508 by the relatively high velocity of stream 9 in portion 502 compared to the reaction velocity of stream 9. Portions of the front 506 that drift into the second flow portion 502 migrate back to the interface 508 because the reaction velocity of the stream 9 is greater than stream 9 flow in portion 504. Other engineered matrices may have differently shaped interfaces that result in non-planar wave fronts of other shapes, and may have more than two flow portions. The engineered matrix bed 500 may be made of any suitable heat-resistant material.

In another aspect of the present invention, a method for simultaneously reducing NOx, products of incomplete combustion, and soot emissions from internal combustion engines is provided. The method comprises adjusting operation of an internal combustion engine 12 so to produce an engine exhaust stream 3 that contains a low concentration of oxides of nitrogen and a corresponding high concentration of soot. A high concentration of products of incomplete combustion may also result from such adjustments. Adjusting or tuning engine 12 to produce such output comprises conventional adjustment methods, such as certain combinations of retarding engine timing, supplying excess oxygen, and causing combustion to occur at a temperature substantially lower than that occurring with an approximately stoichiometric mixture of air and fuel. Preferably, the present method is employed with a diesel engine 12 producing an exhaust stream 3 having a high soot concentration.

Upon exiting engine 12, the combustible constituents of exhaust stream 3 are oxidized within a reaction zone formed within a matrix of heat-resistant media, as described in this specification. Flameless thermal oxidizer 10a,b,c,d,e,f thereby reduces the concentration of products of incomplete combustion and, most importantly, soot in process stream 9. The process stream 9 that exits flameless thermal oxidizer 10a,b,c,d,e,f has low NOx concentration because of the engine tuning and low thermal NOx formation within reaction wave 8.

In yet another aspect of the present invention, an SCR system 76 is disposed on the downstream end of flameless thermal oxidizer 10a,b,c,d,e,f, as shown in FIG. 1. SCR system 76 preferably comprises a conventional SCR-type catalyst and a system to inject a reductant such as ammonia. SCR system 76 comprises a discrete device, as well as a catalytic material disposed within outlet plenum 18a,b, outer plenum 68, or within a separate zone within the matrix shell. Employing flameless thermal oxidizer 10a,b,c,d,e,f upstream of SCR system 76 is especially advantageous for an engine exhaust stream 3 that contains a high soot content, which might otherwise foul or poison the catalyst. The present invention encompasses a system comprising a combination of flameless thermal oxidizer 10a,b,c,d,e,f with SCR system 76, as well as the corresponding method of reducing pollutant emissions by such combined system.

According to still another aspect of the present invention, a system is provided for reducing particulate emissions from an internal combustion engine while simultaneously enhancing thermal efficiency and reducing component wear. Referring to FIG. 1, the system includes an internal combustion engine 12, a thermal oxidizer 10a and a turbo-charger 13. The thermal oxidizer, which may include any of the embodiments 10a through 10f, is disposed between the outlet of engine 12 and the inlet to turbo-charger 13. Because of the operation of thermal oxidizer 10a,b,c,d,e,f, the turbo-charger 13 receives process stream 9 that has a diminished particulate concentration, thus diminishing the wear thereof due to erosion. Further, because of the operation of thermal oxidizer 10a,b,c,d,e,f, the mass flow rate, temperature, and likely the volumetric flow rate, of process stream 9 increases between the outlet of engine 12 and the inlet of turbo-charger 13, thereby enhancing the amount of rotational energy recoverable by the turbo-charger.

The present invention may be embodied in other specific forms without departing from the spirit or essential attributes thereof and, accordingly, reference should be made to the appended claims, rather than to the foregoing specification, as indicating the scope of the invention.

What is claimed is:

1. A method for destroying soot in an exhaust stream from an internal combustion engine, comprising the steps of:
   providing a flameless thermal oxidizer including a matrix of heat-resistant media;
   directing the engine exhaust stream into the matrix;
   heating at least a portion of the matrix to an initial temperature above an autoignition temperature of at least one of the engine exhaust stream and the soot to initiate oxidizing at least a portion of the soot within the matrix in a substantially self-sustaining reaction wave;
   monitoring at least one temperature within the matrix; and
   controlling the location of a reaction wave within the matrix in response to the temperature monitoring step to stabilize the oxidation reaction within the reaction wave.

2. The method of claim 1 wherein the matrix bed within the reaction wave is maintained at a temperature within the range of about 1400° F. to about 3500° F.

3. The method of claim 1 wherein the reaction within the reaction wave is characterized by lack of a flame.

4. The method of claim 1 wherein the reaction forms at least one of: a substantially planar reaction wave that is approximately perpendicular to an engine exhaust stream flow direction; a substantially cylindrical reaction wave; an inverted –V reaction wave; a Bunsen reaction wave; and a Burke-Schumann reaction wave.

5. The method of claim 1 wherein the step of heating at least a portion of the matrix comprises at least one of: electric resistance heating of at least a portion of the matrix by passing an electric current through a conductive portion of the matrix; introducing combustible gas into the matrix and igniting the combustible gas therein; producing an electric arc; and catalyzing at least a portion of the exhaust stream to react while maintaining the catalyst below the temperature at which thermal deactivation of the catalyst occurs.

6. The method of claim 1 wherein the engine exhaust stream comprises at least one of: an exhaust stream from an internal combustion engine burning gasoline and an exhaust stream from an internal combustion engine burning diesel fuel.

7. The method of claim 1 further comprising a step of adding heat to the matrix and to incoming gases to control stability and location of the reaction within the matrix.

8. The method of claim 1 wherein the media is selected from a group comprising at least one of a random ceramic packing, ceramic balls, ceramic saddles, a structured ceramic packing, a ceramic foam material, a ceramic honeycomb shaped material, a metal matrix, a random metal packing, a structured metal packing, and an engineered matrix having a plurality of flow control portions that are defined by the linear gas velocity characteristics thereof.

9. The method of claim 1 further comprising the step of controlling stability and location of the reaction wave with a waveholder disposed within the matrix.

10. The method of claim 1 further comprising the step of directing an air stream into the matrix, the air stream supplying at least a portion of reactants for the oxidizing step.

11. The method of claim 10 further comprising the step of pre-heating the air stream prior to directing the air stream into the matrix.

12. The method of claim 11 wherein the adjusting step includes the step of adjusting a location of the reaction wave by adjusting at least one of the air stream flow rate and the engine exhaust stream flow rate.

13. The method of claim 10 further comprising the step of producing a pre-mixed process stream by substantially mixing the engine exhaust stream and the air stream together within an inlet plenum disposed upstream of the matrix.

14. The method of claim 10 further comprising the step of:
   adjusting a flow rate of at least one of the engine exhaust stream and the air stream in response to the temperature monitoring step so as to enhance the oxidizing step.

15. The method of claim 1 further comprising the steps of:
   supplying a supplemental fuel stream to the matrix from at least one of a vapor and a liquid fuel from a fuel tank; and
   reacting at least a portion of the supplemental fuel stream within the matrix.

16. The method of claim 15 wherein the heating step comprises the step of heating at least a portion of the matrix of heat-resistant media to an initial temperature above an autoignition temperature of at least one of a group comprising the engine exhaust stream, the supplemental fuel stream, and a mixture of the engine exhaust stream and the supplemental fuel stream.

17. The method of claim 16 further comprising the step of:
   adjusting a flow rate of at least one of the engine exhaust stream and the supplemental fuel stream in response to the monitoring step so as to enhance the oxidizing step.

18. The method of claim 1 wherein the internal combustion engine is a part of a mobile vehicle.

19. A method for destroying soot in an exhaust stream from an internal combustion engine, comprising the steps of:
   providing a thermal oxidizer including a matrix of heat-resistant media and at least one longitudinal feed tube, the matrix being disposed substantially in an annulus surrounding the at least one feed tube;
   directing the engine exhaust stream substantially longitudinally into the at least one feed tube;
   directing the engine exhaust stream from the at least one feed tube through the matrix in a substantially longitudinal direction that is substantially counter-current to the flow direction through the feed tube;
   heating at least one of the at least one feed tube and the matrix to an initial temperature above an autoignition temperature of at least one of the engine exhaust stream and the soot; and
   oxidizing at least a portion of the soot within the matrix.

20. The method of claim 19 wherein each one of the at least one feed tube houses heat-resistant media.

21. The method of claim 19 wherein the step of directing the engine exhaust stream from the at least one feed tube into the matrix comprises the step of directing the engine exhaust stream from the at least one feed tube through the matrix in a substantially longitudinal direction that is opposite to the flow direction through the feed tube.

22. A method for destroying soot in an exhaust stream from an internal combustion engine, comprising the steps of:
   providing a thermal oxidizer including a first matrix of heat-resistant media and at least one longitudinal feed tube, the first matrix being disposed substantially in an annulus surrounding the at least one feed tube, the at least one longitudinal feed tube housing a second matrix of heat resistant media;
   directing the engine exhaust stream substantially longitudinally through the at least one feed tube through at least a portion of the first matrix;

directing the engine exhaust stream from the at least one feed tube through the second matrix in a substantially radial direction;

heating at least one of the at least one feed tube and the matrix to an initial temperature above an autoignition temperature of at least one of the engine exhaust stream and the soot; and oxidizing at least a portion of the soot within the matrix.

23. A method for destroying soot in an exhaust stream from an internal combustion engine, comprising the steps of:

providing at least one longitudinal tube that is disposed within a matrix of heat-resistant media;

directing the engine exhaust stream to flow substantially longitudinally through the media;

directing the engine exhaust stream to flow from the matrix into the at least one longitudinal tube;

heating at least one of the at least one longitudinal tube and the matrix to an initial temperature above an autoignition temperature of at least one of the engine exhaust stream and the soot to initiate oxidizing at least a portion of the soot within at least one of the matrix and the at least one longitudinal tube;

monitoring at least one temperature within the matrix; and controlling the location of a reaction wave within the matrix in response to the temperature monitoring step to stabilize the oxidation reaction within the reaction wave.

24. The method of claim 23 wherein the step of providing at least one longitudinal tube includes providing at least one longitudinal tube that houses a second matrix of heat-resistant media and the step of directing the engine exhaust stream to flow from the matrix into the at least one longitudinal tube includes directing the engine exhaust through the second matrix.

25. A system for destroying soot in an exhaust stream from an internal combustion engine for combusting at least one of a diesel fuel, a gasoline, and a gaseous fuel, comprising:

a thermal oxidizer in fluid communication with the exhaust stream and having a matrix of heat-resistant media disposed therein, the matrix having an upstream side and a downstream side;

a heater coupled thereto for heating at least a portion of the matrix to an initial temperature above an autoignition temperature of at least one of the engine exhaust stream and the soot to initiate oxidizing at least a portion of the soot within the matrix; and a control system including at least one temperature sensor that is disposed within the matrix and for providing a signal that represents a temperature within a portion of the matrix, the control system operatively coupled to the heater and the temperature sensor, and for receiving the temperature signal and stabilizing a reaction wave in the matrix within which oxidation of the exhaust stream occurs.

26. The system of claim 25 wherein the heater comprises at least one of: an electric resistance heater; a conductive portion of the matrix for receiving an electric current; a burner for providing hot gas; an electric arc element; and a catalytic section of the matrix for catalyzing at least a portion of the exhaust stream to react while maintaining the catalyst below the temperature at which thermal deativation of the catalyst occurs, whereby the heater is for heating at least a portion of the matrix to an initial temperature above an autoignition temperature of at least one of the engine exhaust stream and the soot to initiate oxidizing at least a portion of the soot within the matrix in a substantially self-sustaining reaction wave.

27. The system of claim 25 further comprising a waveholder coupled to the matrix, whereby the waveholder stabilizes and controls the location of the reaction wave.

28. The system of claim 27 wherein the waveholder comprises at least one of an electric resistance heater; a conductive portion of the matrix for receiving an electric current; a burner for providing hot gas; electric arc element, an air nozzle, a raw fuel nozzle, a combination air and fuel nozzle, and a pilot.

29. The system of claim 25 wherein the media is selected from a group comprising at least one of a random ceramic packing, ceramic balls, ceramic saddles, a structured ceramic packing, a ceramic foam material, a ceramic honeycomb-shaped material, a metal matrix, a random metal packing, a structured metal packing, and an engineered matrix having a plurality of flow control portions that are defined by the linear gas velocity characteristics thereof.

30. The system of claim 25 further comprising a matrix shell substantially surrounding the matrix and having at least one inlet in fluid communication with the exhaust stream and at least one outlet.

31. The system of claim 30 further comprising an inlet plenum disposed between the engine and the upstream side of the matrix and that is formed by the matrix shell and a support member; the support member disposed between the plenum and the matrix, for enabling flow communication therebetween, and coupled to the matrix shell.

32. The system of claim 31 wherein the inlet plenum includes a plenum matrix of heat-resistant media for directing and distributing flow therein.

33. The system of claim 31 further comprising means for providing a supplemental fuel stream to the upstream side of the matrix proximate the inlet plenum.

34. The system of claim 31 wherein the thermal oxidizer includes at least one tube in flow communication with the process stream and disposed within the matrix, each one of the at least one tube having an inlet and an outlet.

35. The system of claim 34 wherein each one of the at least one tube contains heat-resistant media.

36. The system of claim 34 wherein the tube inlet is in flow communication with the engine and the tube outlet is disposed in the matrix.

37. The system of claim 34 wherein the tube inlet is disposed within the matrix.

38. The system of claim 34 wherein the thermal oxidizer includes an intermediate plenum that is formed by the matrix shell and the matrix, the intermediate plenum having an inlet portion and an adjacent outlet portion that are substantially mutually opposite, whereby the exhaust stream turns approximately 180 degrees within the intermediate plenum.

39. The system of claim 38 further comprising means for supplying hot gas for increasing the temperature of the process gas into the intermediate plenum.

40. The system of claim 38 further comprising an outlet plenum formed by the matrix shell and an outlet support member; the outlet support member separating the outlet plenum from the downstream side of the matrix.

41. The system of claim 38 further comprising means for supplying a supplemental fuel into the intermediate plenum.

42. The system of claim 38 wherein the intermediate plenum is devoid of media.

43. The system of claim 30 wherein the control system is in informational communication with the at least one temperature sensor; the control system having an actuating means for controlling a flow rate of at least one of the engine exhaust stream, an air stream in fluid communication with the inlet plenum, and a supplemental fuel stream in fluid communication with the inlet plenum.

44. The system of claim 30 further comprising:
   a feed tube having an inlet in flow communication with the engine exhaust stream, an enclosed end opposing the inlet, and plural exit ports longitudinally disposed along the feed tube;
   the matrix disposed in an annulus around the feed tube, the matrix shell having a plurality of holes therethrough and substantially enclosing the matrix; and,
   an outer shell disposed around the matrix shell, the feed tube inlet, and the matrix, and the outer shell being in flow communication theretogether.

45. The system of claim 44 further comprising a heat-resistant media disposed within the feed tube whereby heat is transferred between the media disposed within the feed tube and the media disposed around the feed tube.

46. A system for destroying soot in an exhaust stream from an internal combustion engine for combusting at least one of a diesel fuel, a gasoline, and a gaseous fuel, comprising:
   a thermal oxidizer in fluid communication with the exhaust stream and having a matrix of heat-resistant media disposed therein, the matrix having an upstream side and a downstream side, and a heater coupled thereto for heating at least a portion of the matrix to an initial temperature above an autoignition temperature of at least one of the engine exhaust stream and the soot;
   a matrix shell substantially surrounding the matrix and having at least one inlet in fluid communication with the exhaust stream and at least one outlet; the matrix shell comprises cooling tubes spaced approximately equidistant apart, housing at least part of the matrix;
   a feed tube having an inlet in flow communication with the engine exhaust stream, an enclosed end opposing the inlet, and plural exit ports longitudinally disposed along the feed tube, the matrix disposed in an annulus around the feed tube, the matrix shell having a plurality of holes therethrough and substantially enclosing the matrix; and,
   an outer shell disposed around the matrix shell, the feed tube inlet, and the matrix, and the outer shell being in flow communication theretogether.

47. The system of claim 25 further comprising means for directing an air stream to the exhaust stream at a point proximate the upstream side of the matrix.

48. The system of claim 25 further comprising means for providing a supplemental fuel stream to the exhaust stream at a point proximate the upstream side of the matrix.

49. The system of claim 48 wherein the means for providing a supplemental fuel stream comprises a vaporization device for vaporizing a liquid fuel.

50. The system of claim 48 wherein the means for providing a supplemental fuel stream comprises:
   a spray nozzle for atomizing a liquid fuel; and
   a vaporization chamber that is for receiving the fuel from the spray nozzle and that is disposed within the matrix, the spray nozzle housed within the vaporization chamber.

51. The system of claim 25 wherein the heater is mechanically connected to the matrix.

52. A method for reducing emissions from an internal combustion engine exhaust stream containing soot, comprising the steps of:
   providing a thermal oxidizer including a matrix of heat-resistant media;
   directing a process stream including the engine exhaust stream into the matrix;
   heating at least a portion of the matrix to an initial temperature above an autoignition temperature of at least one of the process stream and the soot;
   oxidizing at least a portion of the soot within the matrix;
   controlling the location of a reaction wave within the matrix in response to monitoring a temperature within the matrix, thereby stabilizing the oxidation reaction within the reaction wave; and
   directing at least a portion of the process stream from the matrix into contact with a catalyst that enhances destruction of oxides of nitrogen.

53. The method of claim 52 wherein the reaction wave is self-sustaining.

54. The method of claim 52 wherein the step of directing the process stream into contact with the catalyst includes catalyzing the reaction to enhance destruction of oxides of nitrogen.

55. The method of claim 52 wherein the step of directing the process stream into contact with the catalyst includes directing the process stream into a catalyst device that houses the catalyst downstream from the matrix.

56. A system for reducing emissions from an internal combustion engine exhaust stream that includes soot, comprising:
   a thermal oxidizer having a matrix of heat-resistant media disposed therein and a heater coupled thereto for heating at least a portion of the matrix to an initial temperature above an autoignition temperature of at least one of the engine exhaust stream and the soot; an upstream side of the matrix being in flow communication with the internal combustion engine;
   a control system for stabilizing a reaction wave within the matrix, the control system including a temperature sensor disposed within the matrix; and
   a catalyst, downstream of the matrix and in flow communication therewith, for catalyzing a reaction that uses oxides of nitrogen as a reactant.

57. The system of claim 56 wherein the catalyst includes at least one of a noble metal catalyst and a catalyst for catalyzing a reaction using oxides of nitrogen as a reactant.

58. The system of claim 56 wherein the catalyst is housed in a catalytic device that is located downstream from the matrix.

59. The system of claim 56 wherein the catalyst is disposed proximate the matrix within a matrix shell.

* * * * *

UNITED STATES PATENT AND TRADEMARK OFFICE
CERTIFICATE OF CORRECTION

PATENT NO.    : 6,003,305
DATED         : December 21, 1999
INVENTOR(S)   : Richard J. Martin, John D. Stilger, Mark R. Holst, John D. Young Michael P. Barkdoll, Bradley L. Edgar It is certified that error appears in the above-identified patent and that said Letters Patent is hereby corrected as shown below:

Delete the Abstract and insert the following therefore:

ABSTRACT

A method and system for reducing pollutant concentration within an internal combustion engine exhaust stream is disclosed. Soot and products of incomplete combustion in the engine exhaust stream are destroyed by oxidizing them in a flameless thermal oxidizer that contains a matrix of heat-resistant media. Methods and systems for increasing particle residence time within the thermal oxidizer are also disclosed. These techniques include employing electrostatic precipitation, centrifugal force, and particle impaction sections. A method and system for reducing oxides or nitrogen (Nox) emissions is also disclosed. Low Nox concentration may be obtained by adding a SCR system after a thermal oxidizer, by tuning the engine to product low Nox/high soot and destroying the soot in a thermal oxidizer, and by injecting a reductant into the thermal oxidizer. The flameless thermal oxidizer may be located between the engine and a turbo-charger to enhance thermal efficiency and to reduce turbo-charger wear. The thermal oxidizer comprises longitudinal and radial flow systems, which each may include a reaction wave of the following shapes: planar, cylindrical, Bunsen, Burke-Schumann, and an inverted V. An engineered matrix is disclosed to manipulate the shape of the reaction zone.

Signed and Sealed this

Twelfth Day of February, 2002

Attest:

JAMES E. ROGAN
*Director of the United States Patent and Trademark Office*

*Attesting Officer*